US010963921B2

(12) United States Patent
Kirti et al.

(10) Patent No.: US 10,963,921 B2
(45) Date of Patent: Mar. 30, 2021

(54) PRESENTING CONTENT TO AN ONLINE SYSTEM USER ASSIGNED TO A STAGE OF A CLASSIFICATION SCHEME AND DETERMINING A VALUE ASSOCIATED WITH AN ADVANCEMENT OF THE USER TO A SUCCEEDING STAGE

(71) Applicant: Facebook, Inc., Menlo Park, CA (US)

(72) Inventors: Rituraj Kirti, Los Altos, CA (US); David Wood Kaufman, San Francisco, CA (US); Aram Grigoryan, San Ramon, CA (US)

(73) Assignee: Facebook, Inc., Menlo Park, CA (US)

(*) Notice: Subject to any disclaimer, the term of this patent is extended or adjusted under 35 U.S.C. 154(b) by 720 days.

(21) Appl. No.: 15/805,140

(22) Filed: Nov. 7, 2017

(65) Prior Publication Data

US 2019/0139094 A1 May 9, 2019

(51) Int. Cl.
*G06Q 30/02* (2012.01)
*H04L 29/08* (2006.01)
*G06N 20/00* (2019.01)

(52) U.S. Cl.
CPC ..... *G06Q 30/0273* (2013.01); *G06Q 30/0269* (2013.01); *H04L 67/22* (2013.01); *G06N 20/00* (2019.01); *H04L 67/306* (2013.01)

(58) Field of Classification Search
None
See application file for complete search history.

(56) References Cited

U.S. PATENT DOCUMENTS 6,430,539 B1 * 8/2002 Lazarus ............... G06Q 30/02
 705/14.1
6,460,036 B1 * 10/2002 Herz .................. G06Q 30/02
 707/748

(Continued)

OTHER PUBLICATIONS

José González Cabañas, Ángel Cuevas, and Rubén Cuevas. 2017. FDVT: Data Valuation Tool for Facebook Users. In Proceedings of the 2017 CHI Conference on Human Factors in Computing Systems (CHI '17). Association for Computing Machinery, New York, NY, USA, 3799-3809. (Year: 2017).*

(Continued)

*Primary Examiner* — Michael Bekerman
*Assistant Examiner* — Scott Snider
(74) *Attorney, Agent, or Firm* — Fenwick & West LLP

(57) ABSTRACT

An online system receives information describing actions performed by individuals and identifies online system users included among these individuals. Based on the actions they have performed, the users are assigned to sequentially ordered stages of a classification scheme associated with a content-providing user of the online system. The online system receives content items associated with different stages from the content-providing user, in which content items associated with a stage may be presented to users assigned to the stage. The online system may determine an expected return value associated with each stage and an expected advancement value associated with advancement of users assigned to each stage to succeeding stages of the classification scheme. The online system also may determine a value associated with a content item based on a comprehensive value received from the content-providing user, the expected advancement value, and a predicted likelihood of user advancement to a succeeding stage.

27 Claims, 4 Drawing Sheets

(56) References Cited

U.S. PATENT DOCUMENTS

| | | | | |
|---|---|---|---|---|
| 2006/0282328 A1* | 12/2006 | Gerace | ............... | G06F 16/9535 |
| | | | | 705/14.66 |
| 2009/0234711 A1* | 9/2009 | Ramer | .................. | G06F 16/635 |
| | | | | 705/14.66 |
| 2013/0166609 A1* | 6/2013 | Hao | ................... | G06Q 30/0269 |
| | | | | 707/804 |
| 2013/0238751 A1* | 9/2013 | Raleigh | .................. | H04L 67/26 |
| | | | | 709/217 |
| 2018/0211333 A1* | 7/2018 | Lackman | ............ | G06K 9/4604 |

OTHER PUBLICATIONS

Hechelmann, C. B. "Social media engagement in a dedicated Facebook channel: an analysis of relationships to emotional attachment, self-brand connection and brand commitment towards sports sponsoring brands." PhD diss., 2012 (Year: 2012).*

TaghiPourian, Mohammad Javad, and Mahsa Mashayekh Bakhsh. "Loyalty: From single-stage loyalty to four-stage loyalty." International Journal of New Technology and Research 1, No. 6 (2015). (Year: 2015).*

* cited by examiner

PRESENTING CONTENT TO AN ONLINE SYSTEM USER ASSIGNED TO A STAGE OF A CLASSIFICATION SCHEME AND DETERMINING A VALUE ASSOCIATED WITH AN ADVANCEMENT OF THE USER TO A SUCCEEDING STAGE

BACKGROUND

This disclosure relates generally to online systems, and more specifically to presenting content to a user of an online system assigned to a stage of a classification scheme and determining a value associated with an advancement of the user to a succeeding stage.

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for content-providing users to share content by creating content items (e.g., advertisements) for presentation to additional online system users. For example, content-providing users may share photos or videos they have uploaded by creating content items that include the photos or videos that are presented to additional users to whom they are connected in the online system. By allowing content-providing users to create content items for presentation to additional online system users, an online system also provides abundant opportunities to persuade online system users to take various actions and/or to increase awareness about products, services, opinions, or causes among online system users. For example, if a content-providing user of the online system who volunteers for a non-profit organization creates a content item encouraging additional online system users to volunteer for the non-profit organization, the online system may present the content item to these additional online system users.

Conventionally, online systems generate revenue by displaying content to their users. For example, an online system may charge advertisers for each presentation of an advertisement to an online system user (i.e., each "impression"), or for each interaction with an advertisement by an online system user (e.g., each click on the advertisement, each purchase made as a result of clicking through the advertisement, etc.). Furthermore, by presenting content that encourages user engagement with online systems, online systems may increase the number of opportunities they have to generate revenue. For example, if an online system user scrolls through a newsfeed to view content that captures the user's interest, advertisements that are interspersed in the newsfeed also may be presented to the user.

To present content that encourages user engagement with online systems, online systems may select content items for presentation to online system users that are likely to be relevant to the users. Online systems may do so by selecting the content items based on targeting criteria associated with the content items that identify online system users who are likely to have an interest in the content items. For example, a content item maintained in the online system for bakeware may be associated with targeting criteria that identify online system users who have expressed an interest in baking (e.g., users whose user profiles indicate that the users' hobbies include baking, users whose profiles indicate the users' occupations are related to baking, etc.). In this example, upon identifying an opportunity to present a content item to a user of the online system, the online system may select the content item for presentation to the user if attributes for the user satisfy one or more targeting criteria associated with the content item.

However, content-providing users may not be in a position to create optimal content items for presentation to additional online system users since online systems may not track information describing relationships between content-providing users and these additional users. For example, if a content item encouraging online system users to install a pet monitoring application is associated with targeting criteria that identify online system users who have pets, an online system user who satisfies the targeting criteria may be presented with the content item even if the user already has installed the application. In the above example, by failing to keep track of online system users who are new users and current users of the application, targeting criteria are unable to target the presentation of the content item only to online system users who have not installed the application and the online system may waste an opportunity to present content to the user that the user would have found relevant.

Furthermore, by failing to track information describing relationships between content-providing users and additional online system users, content-providing users may be discouraged from creating content items for presentation to these additional users. For example, a content-providing user of the online system who is an advertiser may find it difficult to determine an optimal bid amount associated with an advertisement for new customers and an optimal bid amount associated with an advertisement for loyal customers without knowing the number of online system users who are new or loyal customers, the percentage of online system users who are new customers who are likely to become loyal customers, etc. Thus, in this example, the advertiser may refrain from creating the advertisements without more information about their relationships with online system users to whom the advertisements potentially may be presented.

SUMMARY

An online system receives information describing various actions performed by individuals who may be users of the online system. Examples of actions include purchasing a product or a service, subscribing to a newsletter, registering to attend an event, viewing a specific web page, etc. In some embodiments, the actions may be performed by individuals on third-party systems (e.g., purchases made by individuals in e-commerce websites that are external to the online system).

The online system may receive the information from sources that are external to the online system, such as tracking pixels, client devices, third-party systems, etc. For example, the online system may receive information describing a request by an individual to receive a subscription to a newsletter from a third-party system via a tracking pixel embedded into a subscription confirmation page presented to the individual by the third-party system. Alternatively, in the above example, the online system may receive the information from the third-party system itself. As an additional example, the online system may receive information describing a visit to a physical location of a retail store by an individual if GPS coordinates received from a client device associated with the individual correspond to the physical location of the retail store.

In some embodiments, the sources from which the online system may receive information describing actions performed by individuals also may include offline systems (e.g., point of sale systems, location and proximity tracking beacons, biometric systems, cameras, etc.). For example, the online system may receive information describing purchases made by individuals from point of sale systems and information describing the individuals' visits to physical locations via Bluetooth beacons. As an additional example, the online system may receive information indicating that an individual signed in to an application if their fingerprint was scanned by a client device used to sign in to the application. As yet another example, the online system also may receive information indicating that an individual boarded a flight at an airport if their face was scanned by a biometric camera used as a security screening device at the airport.

In some embodiments, the online system may receive information describing an action performed by an individual in real-time. For example, upon completion of a purchase by an individual in a website for an online retailer, when an order confirmation page is presented to the individual, a tracking pixel that is embedded into the order confirmation page may send information to the online system that describes the purchase made by the individual (e.g., the products or services purchased, an amount of the purchase, a time of the purchase, an email address of the individual who made the purchase, etc.).

The information received at the online system describing actions performed by individuals may include user-identifying information for the individuals. User-identifying information for an individual may include personally identifiable information, such as a full name, a home address, a phone number, an email address, a user identifier that is unique to the individual in the online system or in a third-party system (e.g., a username, a user identification number, or a cookie identifier), a client device identifier (e.g., an IP address), a browser identifier (e.g., a user agent), etc. For example, if an individual clicks on a content item (e.g., an advertisement) presented in a web page external to the online system, information received at the online system may include information identifying the content item, information identifying the web page, information indicating a time at which the user clicked on the content item, information identifying the action as a click on the content item, and an IP address associated with a client device used by the individual to click on the content item. In some embodiments, user-identifying information also may include additional types of information that potentially may be combined with other personal information to identify an individual, such as an age, a gender, a geographic region, etc.

Based on the information describing actions performed by various individuals, the online system may identify users of the online system included among these individuals. For example, suppose that the online system receives information indicating that an individual associated with a particular IP address requested to listen to songs by a particular music artist in a mobile application for a third-party system that provides music streaming services. In this example, the online system may compare the IP address to IP addresses maintained in the online system for various online system users and identify the individual as a user of the online system upon determining that the IP address matches an IP address associated with the user. In some embodiments, once the online system has identified an individual as an online system user, the online system may store information describing one or more corresponding actions performed by the user in association with information identifying the user. In the above example, the online system may store information indicating that the user listened to songs by the music artist in the mobile application for the third-party system in association with a user profile of the online system user that is maintained in the online system.

Information describing actions performed by users of the online system may be associated with stages of one or more classification schemes maintained in the online system. Each classification scheme maintained in the online system may be associated with a content-providing user of the online system (e.g., an online system user who provides content, such as photos, videos, and advertisements, to the online system for presentation to additional online system users). In various embodiments, a classification scheme may include multiple stages, in which each stage is associated with a different set of actions that may be performed by users of the online system. For example, if a content-providing user of the online system associated with a classification scheme is a blogger, a set of actions associated with a stage of the classification scheme may include accessing a web page for the blogger, subscribing to a newsletter from the blogger, or expressing a preference for or sharing content posted by the blogger. In various embodiments, a classification scheme may include a default stage, which is further described below, in which a set of actions associated with the stage is an empty set.

In some embodiments, a number of stages included in a classification scheme and/or a set of actions associated with each stage of the classification scheme may be specified by a content-providing user of the online system associated with the classification scheme. For example, if a content-providing user of the online system associated with a classification scheme is a business entity that runs a cashback website, the entity may specify that there are four stages included in the classification scheme. In this example, the business entity also may specify that the first stage is associated with a set of actions including visiting the cashback website, that the second stage is associated with a set of actions including signing up for an account in the cashback website, that the third stage is associated with a set of actions including making a purchase after clicking through the cashback website, and that the fourth stage is associated with a set of actions including referring other individuals to the cashback website.

In various embodiments, a number of stages included in a classification scheme and/or a set of actions associated with each stage of the classification scheme may be inferred by the online system based on the information describing actions performed by the individuals/users of the online system. In such embodiments, the online system may infer these characteristics of the classification scheme by extracting information from the information describing actions performed by the individuals/users (e.g., the sequence in which the actions were performed, information describing the actions, etc.). For example, suppose that information describing actions associated with a business entity are associated with various names, such as "visiting a retail store" and "making a purchase at a retail store." In this example, based on the names of the actions and the order in which online system users performed the actions, the online system may determine that users who visit a retail store associated with the business entity do not necessarily make a purchase at the retail store and that users who make a purchase at a retail store associated with the business entity must first visit the retail store. Continuing with this example, the online system may then infer that these actions may be associated with different stages of a classification scheme associated with the business entity and that the classification scheme includes at least two stages, in which a first stage is associated with a set of actions including visiting a retail store associated with the business entity and a second stage is associated with actions including making a purchase at a retail store associated with the business entity.

Based at least in part on information describing actions performed by users of the online system, the online system may assign the users to different stages of a classification scheme. The online system may assign an online system user to a stage of the classification scheme by comparing a set of actions that have been performed by the user to a set of actions associated with the stage. In some embodiments, the online system may assign an online system user to a stage of the classification scheme if the user has performed at least a threshold number and/or at least a threshold percentage of a set of actions associated with the stage. For example, if a classification scheme is associated with a content-providing user of the online system who is an application developer, a set of actions associated with a first stage may include downloading an application developed by the application developer, while a set of actions associated with a second stage may include downloading the application and using the application. In this example, if an online system user has downloaded the application, but has not used the application, the online system user may be assigned to the first stage rather than to the second stage because the online system user has performed all (i.e., 100%) of the actions associated with the first stage, but has only performed some (i.e., 50%) of the actions associated with the second stage. In embodiments in which the classification scheme includes a default stage, online system users who have not performed at least a threshold number and/or at least a threshold percentage of a set of actions associated with each additional stage included in the classification scheme may be assigned to the default stage. In the above example, if the classification scheme includes a default stage, an online system user who has not downloaded the application may be assigned to the default stage. In some embodiments, the online system may identify attributes (e.g., demographic information or other characteristics) shared by online system users assigned to a particular stage of the classification scheme and communicate this information to a content-providing user of the online system associated with the classification scheme.

In various embodiments, stages of the classification scheme may be ordered sequentially, such that the stages correspond to a sequence of stages. In some embodiments, the sequence of stages may be ordered based on a degree of closeness of a relationship between online system users who are assigned to each stage and the content-providing user of the online system associated with the classification scheme. For example, a first stage of a classification scheme may correspond to a most distant relationship between online system users who are assigned to the first stage and a content-providing user associated with the classification scheme while a last stage of the classification scheme may correspond to a closest relationship between online system users who are assigned to the last stage and the content-providing user. To illustrate an example of this, suppose that a classification scheme including three stages is associated with a non-profit organization, in which the first stage is associated with a set of actions including accessing a web page for the organization, the second stage is associated with a set of actions including making a small donation to the organization (e.g., less than $100), and the third stage is associated with a set of actions including making a large donation to the organization (e.g., $100 or more). In this example, the ordering of the stages and the set of actions associated with each stage indicate that there is a closer relationship between the organization and online system users who are assigned to the third stage than between the organization and online system users who are assigned to the second stage. Similarly, in this example, the ordering of the stages and the actions associated with the stages also indicate that there is a closer relationship between the organization and online system users who are assigned to the second stage than between the organization and online system users who are assigned to the first stage. In embodiments in which stages of the classification scheme are ordered sequentially, an ordering of the stages may be specified by the content-providing user of the online system associated with the classification scheme. In the above example, the ordering of the stages may be specified by the non-profit organization.

In some embodiments, in addition to inferring characteristics of a classification scheme, such as a number of stages included in the classification scheme and/or a set of actions associated with each stage of the classification scheme, the online system also may infer a sequence of the stages. For example, suppose that a set of actions associated with one stage of a classification scheme associated with a content-providing user of the online system includes viewing a content item associated with the content-providing user, a set of actions associated with another stage of the classification scheme includes visiting a website for the content-providing user, and a set of actions associated with yet another stage of the classification scheme includes subscribing to a newsletter from the content-providing user. In this example, the online system may extract information describing the number of online system users who performed each of the actions and a date and a time at which the online system users performed each of the actions from information describing actions performed by online system users. In the above example, the online system may determine that the number of online system users who viewed the content item associated with the content-providing user is greater than the number of online system users who visited the website for the content-providing user and that the number of online system users who visited the website for the content-providing user is greater than the number of online system users who subscribed to the newsletter from the content-providing user. In this example, the online system also may determine that at least a threshold percentage of online system users who performed all three actions viewed the content item before visiting the website and visited the website before subscribing to the newsletter. Continuing with this example, based on this information, the online system may infer a sequence of the stages, such that a set of actions associated with a first stage in the sequence includes viewing a content item associated with the content-providing user, a set of actions associated with a second stage in the sequence includes visiting a web site for the content-providing user, and a set of actions associated with a third stage in the sequence includes subscribing to a newsletter from the content-providing user.

In embodiments in which the online system infers a number of stages included in a classification scheme, a set of actions associated with each stage of the classification scheme, and/or a sequence of the stages, the online system may allow a content-providing user of the online system associated with the classification scheme to modify one or more characteristics of the classification scheme. For example, once the online system has inferred a number of stages included in a classification scheme, a set of actions associated with each of the stages, and a sequential order of the stages, the online system may communicate information describing the classification scheme to a content-providing user of the online system associated with the classification scheme. In this example, the content-providing user may then add or remove one or more of the stages, insert or delete one or more actions associated with one or more of the stages, or change the sequential order of the stages, and communicate information describing these changes to the online system.

In embodiments in which stages of the classification scheme correspond to a sequence of stages, the online system also may assign an online system user to a stage based at least in part on the sequence of the stages. For example, suppose that an online system user has performed every action associated with three out of five stages of a sequence of stages included in a classification scheme associated with an online retailer, in which the stages are ordered based on a degree of closeness of a relationship between online system users who are assigned to each stage and the online retailer. In this example, the online system may determine which of the three stages corresponds to a closest relationship between online system users who are assigned to the stage and the online retailer based on an ordering of the stages specified by the online retailer. Continuing with this example, the online system may then assign the user only to one of the three stages determined to correspond to the closest relationship between online system users who are assigned to the stage and the online retailer.

The online system may receive one or more content items associated with each stage of the classification scheme from the content-providing user of the online system associated with the classification scheme. A content item that is associated with a stage may be eligible for presentation to users of the online system who have been assigned to the stage. For example, suppose that in a classification scheme associated with a content-providing user of the online system who is an application developer, online system users who have not installed an application developed by the application developer are assigned to a first stage of the classification scheme, users who have installed the application, but infrequently use the application (e.g., less than once per week) are assigned to a second stage of the classification scheme, and users who have installed the application and frequently use the application are assigned to a third stage of the classification scheme. In this example, the online system may receive content items from the application developer associated with each stage, such that a first set of content items associated with the first stage includes promotions for first-time installers, a second set of content items associated with the second stage includes promotions for users who use the application at least once per week, and a third set of content items associated with the third stage includes promotions for users who install a new application developed by the application developer.

In various embodiments, an association between a content item received from the content-providing user of the online system and a stage of the classification scheme associated with the content-providing user may be described in a set of targeting criteria associated with the content item. Targeting criteria associated with a content item may describe one or more attributes for online system users eligible to be presented with the content item. For example, a content item that is associated with a stage of a classification scheme may be associated with a set of targeting criteria that includes a set of actions that have been performed by users of the online system assigned to the stage. In some embodiments, targeting criteria associated with a content item may specify other attributes (e.g., demographic information) for online system users eligible to be presented with the content item. For example, if a content-providing user of the online system is a wine retailer, a content item received from the wine retailer may be associated with targeting criteria specifying a minimum age, such that online system users who have been assigned to a stage of a classification scheme associated with the wine retailer are not eligible to be presented with the content item if user profiles for the users maintained in the online system indicate that the users are not at least the minimum age. As an additional example, suppose that the online system has identified attributes shared by online system users assigned to a particular stage of a classification scheme and has communicated this information to a content-providing user of the online system associated with the classification scheme. In this example, if the online system receives a content item associated with the stage from the content-providing user of the online system, targeting criteria associated with the content item may include the attributes shared by the online system users assigned to the stage.

The online system may reassign an online system user from one stage of the classification scheme to another stage of the classification scheme based on information received at the online system describing actions performed by the user. In embodiments in which the classification scheme corresponds to a sequence of stages, a user may advance to a succeeding stage of the classification scheme upon reassignment of the user to a stage that follows the stage to which they are assigned. In some embodiments, the online system may reassign an online system user from one stage of the classification scheme to a different stage of the classification scheme based on information received at the online system describing actions performed by the user that indicate a change in the user's relationship to the content-providing user of the online system associated with the classification scheme. For example, suppose that in a sequence of stages associated with a content-providing user of the online system who is a photographer, a first stage corresponds to users who have never viewed photos posted by the photographer, a second stage corresponds to users who have viewed photos posted by the photographer, a third stage corresponds to users who have expressed a preference for photos posted by the photographer, and a fourth stage corresponds to users who are social media followers of the photographer. In this example, an online system user who has never viewed photos posted by the photographer may advance from the first stage to the second stage when the online system receives information from a web page for the photographer indicating that the user has viewed photos posted by the photographer. In some embodiments, an online system user may advance through more than one stage of a sequence of stages at one time. In the above example, the online system user who has viewed photos posted by the photographer may advance from the second stage to the fourth stage when the online system receives information from the web page for the photographer indicating that the user has requested to follow a social media account for the photographer.

The online system may determine an expected return value associated with each stage of the classification scheme. An expected return value associated with a stage of the classification scheme may correspond to a monetary profit, a number of installations of an application, a number of social media followers, or any other suitable type of value that potentially may be gained by the content-providing user of the online system associated with the classification scheme from online system users assigned to the stage. In some embodiments, the online system may determine an expected return value associated with a stage of the classification scheme based on historical values that the content-providing user of the online system associated with the classification scheme gained from online system users assigned to the stage. For example, the online system may determine an average of historical values gained by a content-providing user associated with a classification scheme from online system users assigned to a stage of the classification scheme. In this example, the online system may then determine an expected return value associated with this stage by multiplying the average of the historical values by the total number of online system users currently assigned to the stage. Continuing with this example, the online system may repeat this process to determine an expected return value associated with each additional stage of the classification scheme.

Once the online system has determined an expected return value associated with each stage of the classification scheme, the online system may determine an expected advancement value associated with an online system user assigned to a stage of the classification scheme. An expected advancement value may indicate a value associated with an advancement of an online system user from a stage of the classification scheme to a succeeding stage of the classification scheme that may be gained by the content-providing user of the online system associated with the classification scheme. In some embodiments, the online system may determine an expected advancement value associated with one or more online system users assigned to a stage of the classification scheme based at least in part on an expected return value associated with one or more stages of the classification scheme, on a predicted likelihood that the user(s) will advance to one or more succeeding stages of the classification scheme, and/or on a cost associated with the advancement.

A potential cost associated with an advancement may correspond to a value (e.g., an amount of time or a monetary amount) that the content-providing user of the online system associated with the classification scheme may assume (e.g., by investing or foregoing the value) before one or more online system users assigned to a stage of the classification scheme will advance to a succeeding stage of the classification scheme. For example, suppose that a classification scheme associated with a game developer includes two stages, in which online system users who have installed a game, but who have not made any purchases in the game are assigned to a first stage and online system users who have installed the game and have made at least one purchase in the game are assigned to a second stage. In this example, for the first stage, a potential cost that may be assumed by the game developer may correspond to a potential monetary amount the game developer may invest before a user assigned to the first stage makes a purchase in the game (e.g., an amount spent on advertisements for the game and/or a profit margin the game developer may sacrifice by offering promotions to make purchases in the game).

The online system may take into account multiple stages to which online system users assigned to a stage of the classification scheme may advance when determining an expected return value associated with the stage. To illustrate an example of how the online system may determine an expected advancement value associated with an online system user assigned to a stage of a classification scheme, suppose that an expected return value associated with a first stage of a classification scheme is $100,000, that an expected return value associated with a second stage of the classification scheme is $200,000, that an expected return value associated with a third stage of the classification scheme is $350,000, and that there are 10,000 online system users assigned to each stage. Suppose also that a likelihood that an online system user assigned to the first stage will advance to the second stage is 50% and that a likelihood that an online system user assigned to the second stage will advance to the third stage is 25% and that an average cost of $2.50 is associated with each advancement. The online system may first divide the expected return value associated with the first stage of the classification scheme by the number of online system users assigned to this stage, repeat this process for the second stage, and determine a difference between the quotients to obtain an expected return value associated with an advancement of a user assigned to the first stage to the second stage (i.e., ($200,000/10,000)–($100,000/10,000)=$10). The online system may then repeat the process to obtain an expected return value associated with an advancement of a user assigned to the second stage to the third stage (i.e., ($350,000/10,000)–($200,000/10,000)=$15). For each possible advancement, the online system may determine a product of the expected return value associated with the advancement and the probability of the advancement. The online system may subtract the cost of each advancement from a sum of the products to determine an expected advancement value associated with an online system user assigned to the first stage, such that the expected advancement value associated with an online system user assigned to the first stage is $3.75 (i.e., [($10×0.5)+($15×0.25)]–($2.50×2)]). The online system may subtract the cost of advancement from the second stage to the third stage from the product of the expected return value associated with the advancement of a user assigned to the second stage to the third stage and the probability of this advancement, such that the expected advancement value associated with an online system user assigned to the second stage is $1.25 (i.e., ($15×0.25)–$2.50).

The online system may determine an expected advancement value associated with an online system user assigned to a stage of the classification scheme using a model (e.g., a machine-learning model). In such embodiments, the online system may train the model using information describing historical actions performed by online system users, in which the actions are associated with one or more content-providing users of the online system. For example, the online system may train a machine-learning model using information describing clicks on content items associated with various content-providing users, purchases made in association with presentations of content items associated with the content-providing users, and other actions associated with the content-providing users performed by online system users.

In various embodiments, the online system also may train the model using historical information describing the lifetimes of relationships between online system users and content-providing users of the online system. For example, the online system may identify online system users whose most recent actions associated with each content-providing user were performed over a year ago. In this example, for each identified user, the online system may determine a lifetime of a relationship between the user and the content-providing user as a difference between the time that the most recent action was performed and the time that the user performed their first action associated with the content-providing user. Continuing with this example, the online system may train the machine-learning model using the determined lifetimes. In some embodiments, the online system also may train a model using information describing costs assumed by various content-providing users. In the above example, the online system also may train the model based on costs assumed by each content-providing user of the online system before users assigned to different stages of the classification schemes advanced to one or more succeeding stages of the classification schemes.

Once the model has been trained, the online system may use the model to determine an expected advancement value associated with a user assigned to a stage of the classification scheme. For example, a model may predict a likelihood that an online system user who has been assigned to a stage of a classification scheme will advance to one or more succeeding stages and a potential cost that may be assumed by a content-providing user associated with the classification scheme before the user assigned to the stage will advance to the succeeding stage(s). Continuing with this example, the online system may use the model to determine an expected advancement value associated with the online system user using the likelihood of advancement and the potential cost of advancement predicted by the model.

The online system may receive a comprehensive value from the content-providing user of the online system associated with the classification scheme. In some embodiments, the comprehensive value received from the content-providing user of the online system associated with the classification scheme may correspond to a budget. For example, the online system may receive a budget from a content-providing user of the online system associated with a classification scheme for presenting various content items associated with different stages of the classification scheme to online system users assigned to the stages. In various embodiments, the comprehensive value received from the content-providing user of the online system may be associated with a specified amount of time (e.g., a budget for a campaign lasting three months). For example, if a content-providing user of the online system is an advertiser, the online system may receive a budget from the advertiser for presenting one or more advertisements received from the advertiser to online system users over a period of one year.

In some embodiments, the online system may determine a value (e.g., a bid amount) associated with a content item received from the content-providing user of the online system associated with the classification scheme. The online system may determine the value associated with the content item based on a comprehensive value received from the content-providing user of the online system from whom the content item was received and/or based on an expected advancement value associated with a stage of the classification scheme associated with the content-providing user of the online system. For example, suppose that the online system determines that an expected advancement value from a first stage to a second stage of a classification scheme is $10 per user and that an expected advancement value from the second stage to a third stage of the classification scheme is $5 per user. In this example, if the online system receives a budget and a content item associated with each stage from the content-providing user of the online system, since the online system has determined that the expected advancement value from the first stage to the second stage is twice the expected advancement value from the second stage to the third stage, the online system may determine a bid amount associated with each content item based on the budget, such that the bid amount for the content item associated with the first stage is twice the bid amount for the content item associated with the second stage. In some embodiments, the online system also may determine the value associated with the content item based on a quality associated with the content item, based on targeting criteria associated with the content item, based on a number of online system users assigned to each stage of a classification scheme associated with the content item, based on a number of presentations of the content item specified by a content-providing user associated with the content item, or based on any other suitable types of information.

Once the online system has determined a value associated with each content item received from the content-providing user of the online system, the online system may present the content item to online system users eligible to be presented with the content item. For example, upon identifying an opportunity to present a content item to a user of the online system assigned to a stage of a classification scheme, the online system may identify a set of candidate content items eligible for presentation to the user, in which the set of candidate content items includes a content item associated with the stage. In this example, the online system may rank the candidate content items based at least in part on a value associated with each candidate content item (e.g., based on a bid amount associated with each candidate content item or on a score that indicates a predicted affinity of the user for the candidate content item). Continuing with this example, the online system may then select one or more of the candidate content items for presentation to the user based at least in part on the ranking and send the selected content item(s) for display to the user.

In various embodiments, the online system may adjust a rate at which a content item is presented to online system users eligible to be presented with the content item by adjusting a value associated with the content item. The online system may adjust a value associated with a content item based on a comprehensive value received from the content-providing user from whom the content item was received. For example, the online system may pace the presentation of a content item by adjusting the bid amount associated with the content item, such that a budget received at the online system from a content-providing user of the online system from whom the content item was received is used entirely, but not exceeded. In this example, the online system may increase the bid amount to increase the rate at which the content item is selected for presentation to online system users and decrease the bid amount to decrease the rate at which the content item is selected for presentation to online system users.

The online system may generate a report that shows how online system users assigned to stages of the classification scheme have advanced through the stages. For example, the online system may generate a report including various charts and/or graphs that show a number of online system users assigned to each stage of a sequence of stages corresponding to a classification scheme and how the numbers change over time. As an additional example, the online system may generate a report that describes an average amount of time it takes for online system users assigned to each stage of a classification scheme to progress to a succeeding stage of the classification scheme. In some embodiments, the report may include benchmarks associated with the stages. For example, if a content-providing user of the online system associated with a classification scheme is a game developer, the online system may generate a report that shows how online system users have advanced through stages of the classification scheme. In this example, the report also may include benchmarks describing an average rate of advancement of online system users assigned to similar stages of classification schemes associated with other content-providing users of the online system who also are game developers. Once the online system has generated the report, the online system may communicate the report to the content-providing user of the online system associated with the classification scheme.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
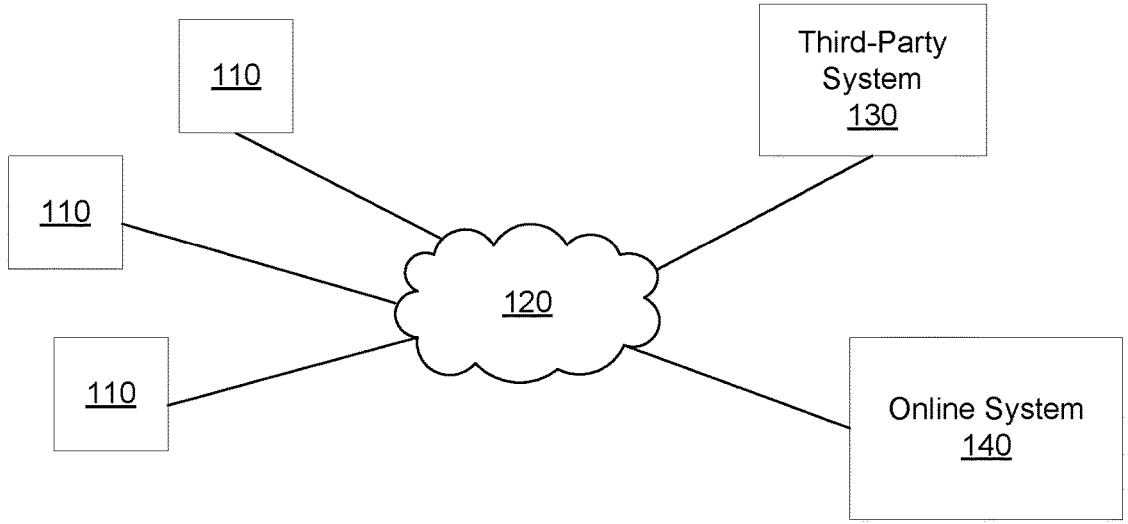
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
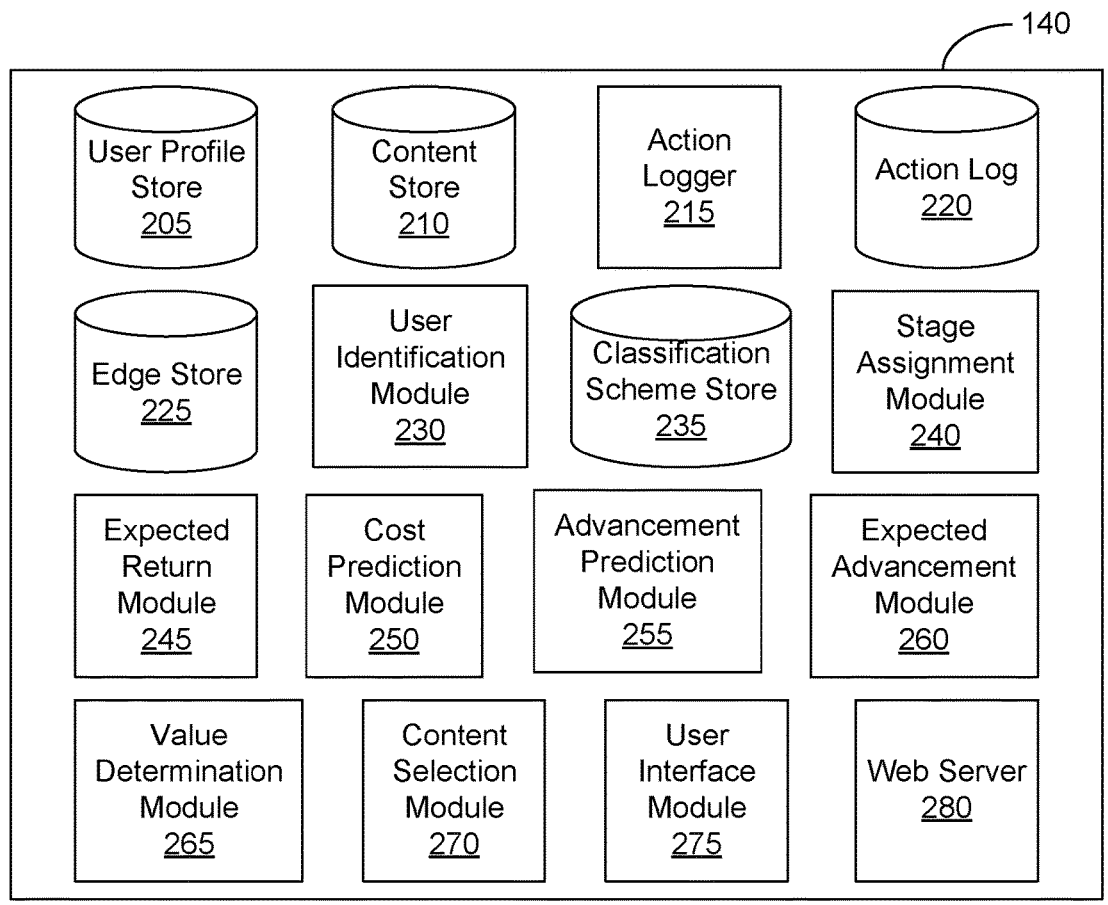
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a user identification module 230, a classification scheme store 235, a stage assignment module 240, an expected return module 245, a cost prediction module 250, an advancement prediction module 255, an expected advancement module 260, a value determination module 265, a content selection module 270, a user interface module 275, and a web server 280. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more user attributes for the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

In some embodiments, the user profile store 205 may store user-identifying information for users of the online system 140. User-identifying information for an online system user may include personally identifiable information. Examples of personally identifiable information include a full name, a home address, a phone number, an email address, a user identifier that is unique to the user in the online system 140 or in a third-party system 130 (e.g., a username, a user identification number, or a cookie identifier), a client device identifier (e.g., an IP address), a browser identifier (e.g., a user agent), etc. In some embodiments, user-identifying information also may include additional types of information that potentially may be combined with other personal information to identify an online system user, such as an age, a gender, a geographic region, etc. For example, user-identifying information for an online system user may include a combination of the user's first name, age, hometown, educational background, and occupation.

While user profiles in the user profile store 205 are frequently associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In some embodiments, objects stored in the content store 210 represent content items received from a content-providing user of the online system 140 associated with a classification scheme. A content item received from a content-providing user of the online system 140 may be associated with a stage of a classification scheme associated with the content-providing user. For example, suppose that a classification scheme is associated with a content-providing user of the online system 140 who is an application developer. In this example, the online system 140 may receive content items from the application developer associated with stages of the classification scheme, such that a first set of content items is associated with a first stage of the classification scheme, a second set of content items is associated with a second stage of the classification scheme, etc. Continuing with this example, the online system 140 may store a set of objects representing the first set of content items in the content store 210 in association with information identifying the first stage of the classification scheme. In the above example, the online system 140 also may store an additional set of objects representing the second set of content items in the content store 210 in association with information identifying the second stage of the classification scheme, etc.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220. Information about actions performed by individuals may include user-identifying information for the individuals. Examples of user-identifying information include personally identifiable information and additional types of information that may be combined to identify an individual, as described above in conjunction with the user profile store 205.

The action logger 215 may receive information describing actions performed by individuals from sources that are external to the online system 140. In some embodiments, sources that are external to the online system 140 from which the action logger 215 may receive information describing actions performed by individuals include tracking pixels and third-party systems 130. For example, the action logger 215 may receive information describing a download of an application by an individual from a third-party system 130 via a tracking pixel embedded into a download confirmation page presented to the individual by the third-party system 130. Alternatively, in the above example, the action logger 215 may receive information describing the download of the application from the third-party system 130 itself. In various embodiments, the action logger 215 may receive information describing actions performed by individuals from client devices 110 associated with the individuals. For example, the action logger 215 may receive information describing a visit to a physical location of a restaurant by an individual if GPS coordinates received from a client device 110 associated with the individual correspond to the physical location of the restaurant.

In some embodiments, the sources from which the action logger 215 may receive information describing actions performed by individuals also may include offline systems (e.g., point of sale systems, location and proximity tracking beacons, biometric systems, cameras, etc.). For example, the action logger 215 may receive information describing purchases made by individuals from point of sale systems and information describing the individuals' visits to physical locations via Bluetooth beacons. As an additional example, the action logger 215 may receive information indicating that an individual signed in to an application if their fingerprint was scanned by a client device 110 used to sign in to the application. As an additional example, the action logger 215 also may receive information indicating that an individual boarded a flight at an airport if their face was scanned by a biometric camera used as a security screening device at the airport.

In some embodiments, the action logger 215 may receive information describing an action performed by an individual in real-time. For example, upon completion of a survey by an individual on a website for an online retailer, a web page is presented to the individual that thanks the individual for completing the survey. In this example, the action logger 215 may receive information via a tracking pixel that is embedded into the web page, in which the information describes the completion of the survey by the individual (e.g., the content of the survey, ratings provided by the individual, a time that the survey was completed, an email address of the individual who completed the survey, etc.).

In various embodiments, the action logger 215 may store information about actions internal to and/or external to the online system 140 performed by online system users. In some embodiments, once the user identification module 230 (described below) has identified an individual as an online system user, the action logger 215 may store information describing one or more corresponding actions performed by the user in association with information identifying the user. For example, the action logger 215 may store information indicating that an online system user downloaded songs by a particular music artist in a mobile application for a third-party system 130 in association with a user profile of the online system user (e.g., in the user profile store 205). In the above example, the action logger 215 also or alternatively may store the information in the action log 220 in association with information identifying the user (e.g., a username or a user identification number). The action logger 215 in the above example also or alternatively may store the information in association with an edge that describes a relationship between the user and the third-party system 130 (e.g., in the edge store 225).

The action log 220 may be used by the online system 140 to track user actions in the online system 140, as well as actions in the third-party system 130 that communicate information to the online system 140. Users may interact with various objects in the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690,254 (U.S. Pat. No. 9,070,141, issued on Jun. 30, 2015), filed on Nov. 30, 2012, U.S. patent application Ser. No. 13/689,969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The edge store 225 also may store information describing assignments of online system users to stages of classification schemes maintained in the online system 140. In some embodiments, once the stage assignment module 240 (described below) assigns an online system user to a stage of a classification scheme maintained in the classification scheme store 235 (also described below), information describing the assignment may be stored in association with an edge that describes a relationship between the online system user and a content-providing user of the online system 140 associated with the classification scheme. For example, information stored in association with an edge may indicate that an online system user has been assigned to a stage of a classification scheme associated with a content-providing user of the online system 140, a type of relationship between the user and the content-providing user corresponding to the stage of the classification scheme, and a time at which the online system user was assigned to the stage. In some embodiments, if the stage assignment module 240 reassigns an online system user from a first stage of a classification scheme to a second stage of the classification scheme, information describing the reassignment may be stored in association with a new edge. Alternatively, information describing the reassignment may be stored in association with an existing edge describing the assignment of the online system user to the first stage of the classification scheme.

The user identification module 230 identifies (e.g., as shown in step 306 of FIG. 3) online system users included among individuals who have performed various actions internal to and/or external to the online system 140. The user identification module 230 may identify online system users based on user-identifying information included among information describing actions performed by various individuals. For example, suppose that the action logger 215 receives information indicating that an individual associated with a particular IP address installed a particular mobile application for a third-party system 130. In this example, the user-identification module 230 may compare the IP address to IP addresses maintained in the online system 140 for various online system users and identify the individual as a user of the online system 140 upon determining that the IP address matches an IP address associated with the user. The functionality of the user identification module 230 is further described below in conjunction with FIG. 3.

The classification scheme store 235 maintains one or more classification schemes associated with one or more content-providing users of the online system 140. Content-providing users of the online system 140 may provide content, such as photos, videos, and advertisements, to the online system 140 for presentation to additional online system users. For example, a classification scheme maintained in the classification scheme store 235 may be associated with an advertiser who provides advertisements to the online system 140 for presentation to various online system users.

In various embodiments, a classification scheme may include multiple stages, in which each stage is associated with a different set of actions that may be performed by users of the online system 140. For example, if a content-providing user of the online system 140 associated with a classification scheme is a blogger, a set of actions associated with a stage of the classification scheme may include accessing a web page for the blogger, subscribing to a newsletter from the blogger, or expressing a preference for or sharing content posted by the blogger. In some embodiments, a classification scheme may include a default stage, in which a set of actions associated with the stage is an empty set. For example, if a classification scheme includes a default stage, the default stage may not be associated with any actions that may be performed by users of the online system 140.

In some embodiments, a number of stages included in a classification scheme and/or a set of actions associated with each stage of the classification scheme may be specified by a content-providing user of the online system 140 associated with the classification scheme. For example, if a content-providing user of the online system 140 associated with a classification scheme is a business entity that runs a cashback website, the entity may specify that there are four stages included in the classification scheme, in which a set of actions associated with the first stage includes visiting the cashback website, a set of actions associated with the second stage includes signing up for an account in the cashback website, a set of actions associated with the third stage includes making a purchase after clicking through the cashback website, and a set of actions associated with the fourth stage includes referring other individuals to the cashback website.

In various embodiments, a number of stages included in a classification scheme and/or a set of actions associated with each stage of the classification scheme may be inferred by the online system 140 based on information describing actions performed by individuals/users of the online system 140. In such embodiments, the online system 140 may infer these characteristics of the classification scheme by extracting information from the information describing actions performed by individuals/users of the online system 140 (e.g., the sequence in which the actions were performed, information describing the actions, etc.). For example, suppose that information describing actions associated with a business entity are associated with various names, such as "visiting a retail store" and "making a purchase at a retail store." In this example, based on the names of the actions and the order in which online system users performed the actions, the online system 140 may determine that users who visit a retail store associated with the business entity do not necessarily make a purchase at the retail store and that users who make a purchase at a retail store associated with the business entity must first visit the retail store. Continuing with this example, the online system 140 may then infer that these actions may be associated with different stages of a classification scheme associated with the business entity and that the classification scheme includes at least two stages, in which a first stage is associated with a set of actions including visiting a retail store associated with the business entity and a second stage is associated with actions including making a purchase at a retail store associated with the business entity.

In various embodiments, stages of a classification scheme may be ordered sequentially, such that each stage corresponds to a stage in a sequence of stages. In embodiments in which stages of a classification scheme are ordered sequentially, the stages may be ordered based on a degree of closeness of a relationship between online system users who are assigned to each stage (e.g., by the stage assignment module 240 described below) and a content-providing user of the online system 140 associated with the classification scheme. In one embodiment, a first stage of a classification scheme may correspond to a most distant relationship between online system users who are assigned to the first stage and a content-providing user associated with the classification scheme while a last stage of the classification scheme may correspond to a closest relationship between online system users who are assigned to the last stage and the content-providing user. For example, suppose that a classification scheme including three stages is associated with a non-profit organization, in which the first stage is associated with a set of actions including accessing a web page for the organization, the second stage is associated with a set of actions including visiting a physical location associated with the organization, and the third stage is associated with a set of actions including performing volunteer work for the organization and/or attending a fundraising event for the organization. In this example, the ordering of the stages and the set of actions associated with each stage indicate that there is a closer relationship between the organization and online system users who are assigned to the third stage than between the organization and online system users who are assigned to the second stage. Similarly, in this example, the ordering of the stages and the actions associated with the stages also indicate that there is a closer relationship between the organization and online system users who are assigned to the second stage than between the organization and online system users who are assigned to the first stage. In embodiments in which stages of a classification scheme are ordered sequentially, an ordering of the stages may be specified by a content-providing user of the online system 140 associated with the classification scheme. In the above example, the ordering of the stages may be specified by the non-profit organization.

In some embodiments, in addition to inferring characteristics of a classification scheme, such as a number of stages included in the classification scheme and/or a set of actions associated with each stage of the classification scheme, the online system 140 also may infer a sequence of the stages. For example, suppose that a set of actions associated with one stage of a classification scheme associated with a content-providing user of the online system 140 includes viewing a content item associated with the content-providing user, a set of actions associated with another stage of the classification scheme includes visiting a website for the content-providing user, and a set of actions associated with yet another stage of the classification scheme includes subscribing to a newsletter from the content-providing user. In this example, the online system 140 may extract information describing the number of online system users who performed each of the actions and a date and a time at which the online system users performed each of the actions from information describing actions performed by online system users. In the above example, the online system 140 may determine that the number of online system users who viewed the content item associated with the content-providing user is greater than the number of online system users who visited the website for the content-providing user and that the number of online system users who visited the website for the content-providing user is greater than the number of online system users who subscribed to the newsletter from the content-providing user. In this example, the online system 140 also may determine that at least a threshold percentage of online system users who performed all three actions viewed the content item before visiting the website and visited the website before subscribing to the newsletter. Continuing with this example, based on this information, the online system 140 may infer a sequence of the stages, such that a set of actions associated with a first stage in the sequence includes viewing a content item associated with the content-providing user, a set of actions associated with a second stage in the sequence includes visiting a website for the content-providing user, and a set of actions associated with a third stage in the sequence includes subscribing to a newsletter from the content-providing user.

In embodiments in which the online system 140 infers a number of stages included in a classification scheme, a set of actions associated with each stage of the classification scheme, and/or a sequence of the stages, the online system 140 may allow a content-providing user of the online system 140 associated with the classification scheme to modify one or more characteristics of the classification scheme. For example, once the online system 140 has inferred a number of stages included in a classification scheme, a set of actions associated with each of the stages, and a sequential order of the stages, the online system 140 may communicate information describing the classification scheme to a content-providing user of the online system 140 associated with the classification scheme. In this example, the content-providing user may then add or remove one or more of the stages, insert or delete one or more actions associated with one or more of the stages, or change the sequential order of the stages, and communicate information describing these changes to the online system 140.

A stage of a classification scheme may be associated with one or more content items received from a content-providing user of the online system 140 associated with the classification scheme. A content item that is associated with a stage may be eligible for presentation to users of the online system 140 who have been assigned to the stage (e.g., by the stage assignment module 240 described below). For example, suppose that in a classification scheme associated with a content-providing user of the online system 140 who is an application developer, online system users who have not installed an application developed by the application developer are assigned to a first stage of the classification scheme, users who have installed the application, but infrequently use the application (e.g., less than once per week) are assigned to a second stage of the classification scheme, and users who have installed the application and frequently use the application are assigned to a third stage of the classification scheme. In this example, the online system 140 may receive content items from the application developer that are associated with the stages, such that a first set of content items associated with the first stage includes promotions for first-time installers, a second set of content items associated with the second stage includes promotions for users who use the application at least once per week, and a third set of content items associated with the third stage includes promotions for users who install a new application developed by the application developer.

In various embodiments, an association between a content item received from a content-providing user of the online system 140 and a stage of a classification scheme associated with the content-providing user may be described in a set of targeting criteria associated with the content item that describe one or more attributes for online system users eligible to be presented with the content item. In such embodiments, online system users eligible to be presented with a content item associated with a stage of a classification scheme may include users who have been assigned to the stage of the classification scheme (e.g., by the stage assignment module 240 described below). In some embodiments, attributes for online system users eligible to be presented with a content item may correspond to actions that have been performed by the users. For example, a content item that is associated with a stage of a classification scheme may be associated with a set of targeting criteria that describe a set of actions that have been performed by users of the online system 140 assigned to the stage. In some embodiments, targeting criteria associated with a content item may specify other attributes (e.g., demographic information) for online system users eligible to be presented with the content item. For example, if a content-providing user of the online system 140 owns a beer brewery, a content item received from the content-providing user may be associated with targeting criteria specifying a minimum age, such that online system users who have been assigned to a stage of a classification scheme associated with the content-providing user are eligible to be presented with the content item if user profiles for the users maintained in the online system 140 indicate that the users are at least the minimum age.

A classification scheme maintained in the classification scheme store 235 may be associated with a comprehensive value. A comprehensive value associated with a classification scheme may be received at the online system 140 from a content-providing user of the online system 140 associated with the classification scheme. In some embodiments, a comprehensive value associated with a classification scheme may correspond to a budget. For example, the online system 140 may receive a budget from a content-providing user of the online system 140 associated with a classification scheme, in which the content-providing user is an advertiser. In this example, the budget may be used to pay for each presentation of an advertisement associated with a stage of the classification scheme to online system users assigned to the stage. In various embodiments, a comprehensive value received from a content-providing user of the online system 140 may be associated with a specified amount of time (e.g., a budget for a campaign lasting three months). For example, if a content-providing user of the online system 140 is an advertiser, the online system 140 may receive a budget from the advertiser for presenting one or more advertisements received from the advertiser to online system users over a period of one month. The classification scheme store 235 is further described below in conjunction with FIG. 3.

The stage assignment module 240 assigns (e.g., as shown in step 312 of FIG. 3) users of the online system 140 to different stages of a classification scheme associated with a content-providing user of the online system 140. The stage assignment module 240 may assign online system users to different stages of a classification scheme based at least in part on information describing actions performed by the users. The stage assignment module 240 may assign an online system user to a stage of a classification scheme by comparing (e.g., as shown in step 310 of FIG. 3) a set of actions that have been performed by the user to a set of actions associated with the stage.

In some embodiments, the stage assignment module 240 may assign an online system user to a stage of a classification scheme if the user has performed at least a threshold number and/or at least a threshold percentage of a set of actions associated with the stage. For example, if a classification scheme is associated with a content-providing user of the online system 140 who is associated with an online retailer, a set of actions associated with a first stage may include visiting a website for the online retailer, while a set of actions associated with a second stage may include visiting the website and making a purchase in the website. In this example, if an online system user has visited the website, but has not made a purchase in the website, the online system user may be assigned to the first stage rather than to the second stage because the online system user has performed all (i.e., 100%) of the actions associated with the first stage, but has only performed some (i.e., 50%) of the actions associated with the second stage. In embodiments in which a classification scheme includes a default stage, online system users who have not performed at least a threshold number and/or at least a threshold percentage of a set of actions associated with each additional stage included in the classification scheme may be assigned to the default stage. In the above example, if the classification scheme includes a default stage, an online system user who has not visited the website may be assigned to the default stage.

In embodiments in which stages of a classification scheme correspond to a sequence of stages, the stage assignment module 240 also may assign an online system user to a stage based at least in part on the sequence of the stages. For example, suppose that an online system user has performed every action associated with four out of five stages of a sequence of stages included in a classification scheme associated with an application developer, in which the stages are ordered based on a degree of closeness of a relationship between online system users who are assigned to each stage and the application developer. In this example, the stage assignment module 240 may determine which of the four stages corresponds to a closest relationship between online system users who are assigned to the stage and the application developer based on an ordering of the stages specified by the application developer. Continuing with this example, the stage assignment module 240 may then assign the user only to one of the four stages corresponding to the closest relationship between online system users who have performed the set of actions associated with the stage and the application developer.

The stage assignment module 240 may reassign (e.g., as shown in step 312 of FIG. 3) an online system user from one stage of a classification scheme to another stage of the classification scheme based on information received at the online system 140 describing actions performed by the user. For example, after the stage assignment module 240 has assigned an online system user to a stage of a classification scheme, the action logger 215 subsequently may receive information describing actions internal to or external to the online system 140 performed by the user. In this example, based on the received information, the stage assignment module 240 may reassign the user to a different stage of the classification scheme.

In embodiments in which a classification scheme corresponds to a sequence of stages, a user may advance to a succeeding stage of the classification scheme upon reassignment of the user to a stage that follows the stage to which they were assigned based on information received at the online system 140 describing actions performed by the user that indicate a change in the user's relationship to a content-providing user of the online system 140 associated with the classification scheme. For example, suppose that in a sequence of stages associated with a content-providing user of the online system 140 who is a musician, a first stage corresponds to users who have never listened to music by the musician, a second stage corresponds to users who have listened to music by the musician, a third stage corresponds to users who have downloaded music by the musician, and a fourth stage corresponds to users who have recommended music by the musician to others. In this example, an online system user who has listened to music by the musician may advance from the first stage to the second stage when the online system 140 receives information from an online digital media store indicating that the user has listened to music by the musician. In some embodiments, an online system user may advance through more than one stage of a sequence of stages at one time. In the above example, the online system user who has listened to music by the musician may advance from the second stage to the fourth stage when the online system 140 receives information from the online digital media store indicating that the user has requested to recommend music by the musician to others.

The stage assignment module 240 also may identify (e.g., as shown in step 316 of FIG. 3) attributes shared by online system users assigned to a particular stage of a classification scheme. In some embodiments, the stage assignment module 240 may identify demographic information or other characteristics shared by online system users assigned to each stage of a classification scheme. For example, the stage assignment module 240 may identify hobbies or interests shared by at least a threshold percentage of online system users assigned to a stage of a classification scheme. Once the stage assignment module 240 has identified attributes shared by online system users assigned to each stage of a classification scheme, the online system 140 may communicate this information to a content-providing user of the online system 140 associated with the classification scheme. The functionality of the stage assignment module 240 is further described below in conjunction with FIGS. 3 and 4.

The expected return module 245 determines (e.g., as shown in step 336 of FIG. 3) an expected return value associated with a stage of a classification scheme. An expected return value associated with a stage of a classification scheme may correspond to a monetary profit, a number of installations of an application, a number of social media followers, or any other suitable type of value that potentially may be gained by a content-providing user of the online system 140 associated with the classification scheme from online system users assigned to the stage. In some embodiments, the expected return module 245 may determine an expected return value associated with a stage of a classification scheme based on historical values that a content-providing user of the online system 140 associated with the classification scheme gained from online system users assigned to the stage. For example, the expected return module 245 may determine an average of historical values gained by a content-providing user associated with a classification scheme from online system users assigned to a stage of the classification scheme. In this example, the expected return module 245 may then determine an expected return value associated with this stage by multiplying the average of the historical values by the total number of online system users currently assigned to the stage. Continuing with this example, the expected return module 245 may repeat this process to determine an expected return value associated with each additional stage of the classification scheme.

In some embodiments, the expected return module 245 may take into account multiple stages to which online system users assigned to a stage of a classification scheme may advance when determining an expected return value associated with the stage. In such embodiments, the expected return module 245 may determine an expected return value associated with a stage based on a likelihood that one or more online system users currently assigned to the stage will advance to one or more succeeding stages. For example, the expected return module 245 may determine a product of an average of historical values gained by a content-providing user associated with a classification scheme from online system users assigned to a stage of the classification scheme and the total number of online system users currently assigned to the stage. In this example, the expected return module 245 also may determine a number of the online system users currently assigned to the stage who are likely to advance to a succeeding stage by multiplying the number of online system users currently assigned to the stage by a likelihood that these users will advance to a succeeding stage (e.g., predicted by the advancement prediction module 255 described below). Continuing with this example, the expected return module 245 may repeat this process for each succeeding stage in the classification scheme based on the number of online system users who are likely to advance to the stage. In this example, the expected return module 245 may then determine an expected return value associated with the stage as a sum of the products determined for the stage and for each succeeding stage of the classification scheme. The functionality of the expected return module 245 is further described below in conjunction with FIG. 3.

The cost prediction module 250 predicts (e.g., as shown in step 336 of FIG. 3) a potential cost associated with an advancement of one or more online system users assigned to a stage of a classification scheme to a succeeding stage of the classification scheme. A potential cost associated with an advancement of an online system user assigned to a stage of a classification scheme to a succeeding stage of the classification scheme may correspond to a value (e.g., an amount of time or a monetary amount) that a content-providing user of the online system 140 associated with the classification scheme may assume (e.g., by investing or foregoing the value) before the online system user assigned to the stage will advance to the succeeding stage. For example, suppose that a classification scheme associated with a content-providing user of the online system 140 who is an application developer includes two stages, in which a first stage corresponds to online system users who have installed an application, but who have not made any purchases in the application and a second stage corresponds to online system users who have installed the application and have made at least one purchase in the application. In this example, for the first stage, a potential cost that may be assumed by the application developer may correspond to a potential monetary amount the application developer may invest before a user assigned to the first stage makes a purchase in the application (e.g., an amount the application developer may spend on advertisements for the application and/or a profit margin the application developer may sacrifice by offering promotions to make purchases in the application).

The cost prediction module 250 may predict a potential cost associated with an advancement of one or more online system users assigned to a stage of a classification scheme to a succeeding stage of the classification scheme using a model (e.g., a machine-learning model). In such embodiments, the cost prediction module 250 may train the model using information describing costs associated with historical actions performed by online system users, in which the actions are associated with one or more content-providing users of the online system 140. For example, the cost prediction module 250 may train a machine-learning model using information describing previous costs, such as amounts of time elapsed or monetary amounts that one or more content-providing users of the online system 140 assumed (e.g., by investing or foregoing the value) before online system users performed various actions associated with the content-providing user(s).

Once a model has been trained, the cost prediction module 250 may use the model to predict a potential cost associated with an advancement of an online system user who has been assigned to a stage of a classification scheme to a succeeding stage of the classification scheme. For example, the cost prediction module 250 may use a model to predict a potential cost that a content-providing user of the online system 140 associated with a classification scheme may assume before an online system user who has been assigned to a stage of the classification scheme will perform one or more actions corresponding to a succeeding stage. In this example, the model may predict the potential cost based on information describing historical actions performed by online system users having at least a threshold measure of similarity to the user and/or based on information describing historical actions performed by online system users, in which the actions are associated with one or more content-providing users of the online system 140 having at least a threshold measure of similarity to a content-providing user associated with the classification scheme. Continuing with this example, the cost prediction module 250 may then predict that the potential cost that the content-providing user may assume before the user will advance to the succeeding stage of the classification scheme is equal to the potential cost predicted by the model. The functionality of the cost prediction module 250 is further described below in conjunction with FIG. 3.

The advancement prediction module 255 predicts (e.g., as shown in step 338 of FIG. 3) a likelihood that one or more online system users who are assigned to a stage of a classification scheme will advance to a succeeding stage of the classification scheme. In some embodiments, the advancement prediction module 255 may predict a likelihood that one or more online system users who are assigned to a stage of a classification scheme will advance to a succeeding stage of the classification scheme based on historical information indicating that online system users assigned to the stage advanced to the succeeding stage. For example, based on historical information maintained in the online system 140 (e.g., in the edge store 225), the advancement prediction module 255 may determine a percentage of online system users assigned to a stage of a classification scheme who advanced to a succeeding stage of the classification scheme. In this example, the advancement prediction module 255 may then predict that a likelihood that one or more online system users who are assigned to the stage of the classification scheme will advance to the succeeding stage of the classification scheme is equal to the percentage.

The advancement prediction module 255 may predict a likelihood that one or more online system users who are assigned to a stage of a classification scheme will advance to a succeeding stage of the classification scheme using a model (e.g., a machine-learning model). In such embodiments, the advancement prediction module 255 may train the model using information describing historical actions performed by online system users, in which the actions are associated with one or more content-providing users of the online system 140. For example, the advancement prediction module 255 may train a machine-learning model using information describing previous clicks on content items associated with various content-providing users, previous purchases made in association with presentations of content items associated with the content-providing users, and other actions associated with the content-providing users previously performed by online system users.

In embodiments in which the advancement prediction module 255 predicts a likelihood that one or more online system users who are assigned to a stage of a classification scheme will advance to a succeeding stage of the classification scheme using a model, the advancement prediction module 255 also may train the model using historical information describing the lifetimes of relationships between online system users and content-providing users of the online system 140. For example, the advancement prediction module 255 may identify online system users whose most recent actions associated with one or more content-providing users were performed over two years ago. In this example, for each identified user, the advancement prediction module 255 may determine a lifetime of a relationship between the user and each content-providing user as a difference between the time that the most recent action was performed and the time that the user performed their first action associated with the content-providing user. Continuing with this example, the advancement prediction module 255 may train the machine-learning model using the determined lifetimes.

Once a model has been trained, the advancement prediction module 255 may use the model to predict a likelihood that an online system user who has been assigned to a stage of a classification scheme will advance to a succeeding stage of the classification scheme. For example, the advancement prediction module 255 may use a model to predict a likelihood that an online system user who has been assigned to a stage of a classification scheme will perform one or more actions corresponding to a succeeding stage. In this example, the model may predict the likelihood that the user will perform the action(s) based on information describing historical actions performed by online system users having at least a threshold measure of similarity to the user and/or based on information describing historical actions performed by online system users, in which the actions are associated with one or more content-providing users of the online system 140 having at least a threshold measure of similarity to a content-providing user associated with the classification scheme. In this example, the model also may predict the likelihood that the user will perform the action(s) based on a predicted lifetime of the relationship between the user and the content-providing user. Continuing with this example, the advancement prediction module 255 may then predict that the likelihood that the user will advance to the succeeding stage of the classification scheme is equal to the likelihood predicted by the model. The functionality of the advancement prediction module 255 is further described below in conjunction with FIG. 3.

The expected advancement module 260 determines (e.g., as shown in step 340 of FIG. 3) an expected advancement value associated with an advancement of an online system user assigned to a stage of a classification scheme to a succeeding stage of the classification scheme. An expected advancement value may indicate a value associated with an advancement of an online system user from a stage of a classification scheme to a succeeding stage of the classification scheme that may be gained by a content-providing user of the online system 140 associated with the classification scheme. In some embodiments, the expected advancement module 260 may determine an expected advancement value based at least in part on an expected return value associated with one or more stages of a classification scheme, on a predicted likelihood that one or more online system users assigned to a stage of the classification scheme will advance to one or more succeeding stages of the classification scheme, and/or on a cost associated with the advancement.

To illustrate an example of how the expected advancement module 260 may determine an expected advancement value associated with an online system user assigned to a stage of a classification scheme, suppose that an expected return value associated with a first stage of a classification scheme is $50,000, that an expected return value associated with a second stage of the classification scheme is $100,000, that an expected return value associated with a third stage of the classification scheme is $250,000, and that there are 10,000 online system users assigned to each stage. Suppose also that a likelihood that an online system user assigned to the first stage will advance to the second stage is 50% and that a likelihood that an online system user assigned to the second stage will advance to the third stage is 25% and that an average cost of $1.50 is associated with each advancement. The expected advancement module 260 may first divide the expected return value associated with the first stage of the classification scheme by the number of online system users assigned to this stage, repeat this process for the second stage, and determine a difference between the quotients to obtain an expected return value associated with an advancement of a user assigned to the first stage to the second stage (i.e., ($100,000/10,000)−($50,000/10,000)=$5). The expected advancement module 260 may then repeat the process to obtain an expected return value associated with an advancement of a user assigned to the second stage to the third stage (i.e., ($250,000/10,000)−($100,000/10,000)=$15). For each possible advancement, the expected advancement module 260 may determine a product of the expected return value associated with the advancement and the probability of the advancement. The expected advancement module 260 may subtract the cost of each advancement from a sum of the products to determine an expected advancement value associated with an online system user assigned to the first stage, such that the expected advancement value is $3.25 (i.e., [($5×0.5)+($15×0.25)]−($1.50×2)]). The expected advancement module 260 may subtract the cost of advancement from the second stage to the third stage from the product of the expected return value associated with the advancement of a user assigned to the second stage to the third stage and the probability of this advancement, such that the expected advancement value associated with an online system user assigned to the second stage is $2.25 (i.e., ($15×0.25)−$1.50). The functionality of the expected advancement module 260 is further described below in conjunction with FIG. 3.

The value determination module 265 determines (e.g., as shown in step 342 of FIG. 3) a value (e.g., a bid amount) associated with a content item received from a content-providing user of the online system 140 associated with a classification scheme. The value determination module 265 may determine a value associated with a content item based on a comprehensive value received from a content-providing user of the online system 140 from whom the content item was received and/or based on an expected advancement value associated with a stage of a classification scheme associated with the content-providing user of the online system 140. For example, suppose that the expected advancement module 260 determines that an expected advancement value from a first stage to a second stage of a classification scheme is $6 per user and that an expected advancement value from the second stage to a third stage of the classification scheme is $3 per user. In this example, if the online system 140 receives a budget and a content item associated with each stage from the content-providing user of the online system 140, since the expected advancement module 260 has determined that the expected advancement value from the first stage to the second stage is twice the expected advancement value from the second stage to the third stage, the value determination module 265 may determine a bid amount associated with each content item based on the budget, such that the bid amount for the content item associated with the first stage is twice the bid amount for the content item associated with the second stage.

In some embodiments, the value determination module 265 also may determine a value associated with a content item based on a quality associated with the content item, based on targeting criteria associated with the content item, based on a number of online system users assigned to each stage of a classification scheme associated with the content item, based on a number of impressions of the content item specified by a content-providing user associated with the content item, or based on any other suitable types of information. For example, the value determination module 265 may determine higher values associated with content items that are higher quality than for content items that are lower quality. As an additional example, if a content-providing user associated with a content item requests that 1,000 impressions of the content item be achieved within one month, the value determination module 265 may determine a higher value associated with the content item than if the content-providing user associated with the content item requested that 100 impressions of the content item be achieved within one month.

In various embodiments, the value determination module 265 may adjust a value associated with a content item to adjust a rate at which the content item is selected for presentation to online system users eligible to be presented with the content item. The value determination module 265 may adjust a value associated with a content item based on a comprehensive value received from a content-providing user from whom the content item was received. For example, suppose that the online system 140 receives a budget from a content-providing user of the online system 140, in which the budget is associated with a content item and a time period in which the budget is to be used. In this example, to ensure that the entire budget is used by the end of the time period and that the budget is not exceeded, the value determination module 265 may pace the presentation of the content item by adjusting a bid amount associated with the content item. In the above example, the value determination module 265 may increase the bid amount to increase the rate at which the content item is selected for presentation to online system users and decrease the bid amount to decrease the rate at which the content item is selected for presentation to online system users. The functionality of the value determination module 265 is further described below in conjunction with FIG. 3.

The content selection module 270 selects (e.g., as shown in step 326 of FIG. 3) one or more content items for presentation to online system users assigned to a stage of a classification scheme. The content selection module 270 may identify a set of candidate content items eligible for presentation to an online system user who has been assigned to a stage of a classification scheme and select one or more of the candidate content items for presentation to the user. For example, upon identifying an opportunity to present a content item to a user of the online system 140 assigned to a stage of a classification scheme, the content selection module 270 may identify a set of candidate content items eligible for presentation to the user, in which the set of candidate content items includes one or more content items associated with the stage. In some embodiments, the content selection module 270 may rank candidate content items based at least in part on a value associated with each candidate content item and select one or more content items having the highest values for presentation to the user. In the above example, the content selection module 270 may rank the candidate content items based at least in part on a bid amount associated with each candidate content item. Continuing with this example, the content selection module 270 may then select one or more of the candidate content items for presentation to the user based at least in part on the ranking.

In some embodiments, a value associated with a candidate content item may correspond to a score computed by the content selection module 270 that indicates a predicted affinity of an online system user for the candidate content item. For example, the content selection module 270 may compute an affinity score for each candidate content item eligible for presentation to a user that indicates a predicted affinity of the user for the candidate content item. In this example, the content selection module 270 may then rank the candidate content items based at least in part on a bid amount and/or the affinity score associated with each candidate content item and select one or more of the candidate content items for presentation to the user based at least in part on the ranking. The functionality of the content selection module 270 is further described below in conjunction with FIG. 3.

The user interface module 275 generates (e.g., as shown in step 328 of FIG. 3) a user interface in which one or more content items selected for presentation to a user of the online system 140 are presented. In some embodiments, the user interface generated by the user interface module 275 may include a feed of content items in which one or more content items selected by the content selection module 270 may be presented. For example, the user interface module 275 may generate a newsfeed associated with a user profile of an online system user, in which the newsfeed includes multiple content items, such as advertisements, videos, images, text, etc. The user interface also may include a set of interactive elements (e.g., buttons) that each correspond to an option associated with a content item that may be selected by a user presented with the user interface. Examples of options include an option to express a preference for a content item, an option to share the content item with additional online system users, and an option to comment on the content item. For example, if an online system user presented with a content item clicks on a button corresponding to an option to express a preference for the content item, other online system users to whom the user is connected may receive a notification that the user has expressed a preference for the content item.

The user interface module 275 also may generate (e.g., as shown in step 344 of FIG. 3) a report that shows how online system users assigned to stages of a classification scheme have advanced through the stages. For example, the user interface module 275 may generate a report including various charts and/or graphs that show a number of online system users assigned to each stage of a sequence of stages corresponding to a classification scheme and how the numbers change over time. As an additional example, the user interface module 275 may generate a report that describes an average amount of time it takes for online system users assigned to each stage of a classification scheme to progress to a succeeding stage of the classification scheme. In some embodiments, the report may include benchmarks associated with the stages. For example, if a content-providing user of the online system 140 associated with a classification scheme is a game developer, the user interface module 275 may generate a report that shows how online system users have advanced through stages of the classification scheme. In this example, the report also may include benchmarks describing an average rate of advancement of online system users assigned to similar stages of classification schemes associated with other content-providing users of the online system 140 who also are game developers. The report also may include information identifying a set of content items associated with each stage of a classification scheme or any other suitable information that may be relevant to a content-providing user associated with the classification scheme.

The functionality of the user interface module 275 is further described below in conjunction with FIGS. 3 and 5.

The web server 280 links the online system 140 via the network 120 to the one or more client devices 110, as well as to the third-party system 130 and/or one or more third-party systems 130. The web server 280 serves web pages, as well as other content, such as JAVA®, FLASH®, XML and so forth. The web server 280 may receive and route messages between the online system 140 and the client device 110, for example, instant messages, queued messages (e.g., email), text messages, short message service (SMS) messages, or messages sent using any other suitable messaging technique. A user may send a request to the web server 280 to upload information (e.g., images or videos) that are stored in the content store 210. Additionally, the web server 280 may provide application programming interface (API) functionality to send data directly to native client device operating systems, such as IOS®, ANDROID™, WEBOS® or BlackberryOS.

Figure 3:
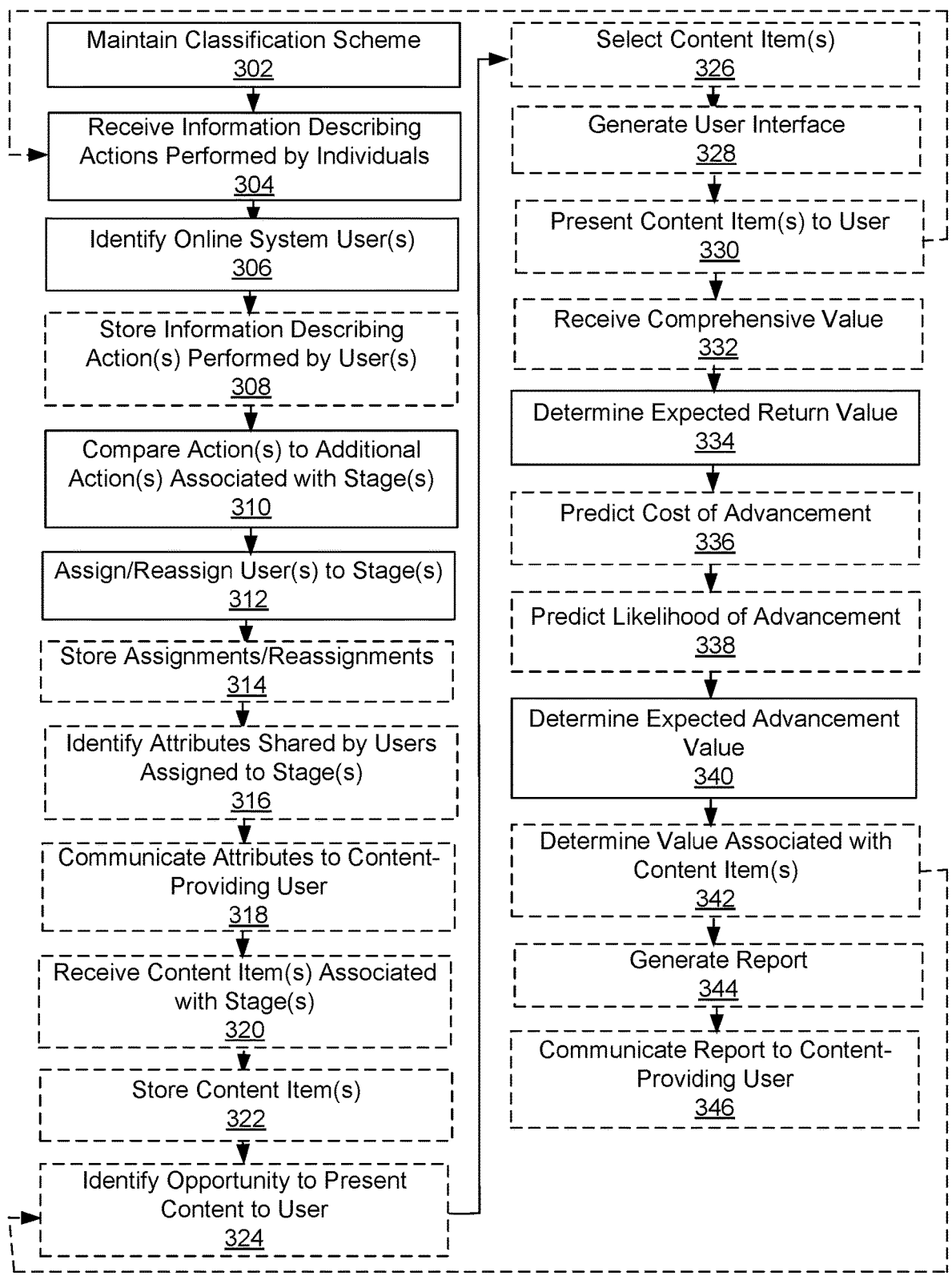
FIG. 3 is a flow chart of a method for presenting content to a user of an online system assigned to a stage of a classification scheme and determining a value associated with an advancement of the user to a succeeding stage, in accordance with an embodiment.

Presenting Content to an Online System User Assigned to a Stage of a Classification Scheme and Determining a Value Associated with an Advancement of the User to a Succeeding Stage FIG. 3 is a flow chart of a method for presenting content to a user of an online system assigned to a stage of a classification scheme and determining a value associated with an advancement of the user to a succeeding stage. In other embodiments, the method may include different and/or additional steps than those shown in FIG. 3. Additionally, steps of the method may be performed in a different order than the order described in conjunction with FIG. 3.

The online system 140 may maintain 302 (e.g., in the classification scheme store 235) one or more classification schemes associated with one or more content-providing users of the online system 140. Content-providing users of the online system 140 may provide content, such as photos, videos, and advertisements, to the online system 140 for presentation to additional online system users. For example, a classification scheme maintained 302 in the online system 140 may be associated with an advertiser who provides advertisements to the online system 140 for presentation to various online system users.

In various embodiments, a classification scheme may include multiple stages, in which each stage is associated with a different set of actions that may be performed by users of the online system 140. For example, if a content-providing user of the online system 140 associated with a classification scheme is a blogger, a set of actions associated with a stage of the classification scheme may include accessing a web page for the blogger, subscribing to a newsletter from the blogger, or expressing a preference for or sharing content posted by the blogger. In some embodiments, a classification scheme may include a default stage, in which a set of actions associated with the stage is an empty set. For example, if a classification scheme includes a default stage, the default stage may not be associated with any actions that may be performed by users of the online system 140.

In some embodiments, a number of stages included in a classification scheme and/or a set of actions associated with each stage of the classification scheme may be specified by a content-providing user of the online system 140 associated with the classification scheme. For example, if a content-providing user of the online system 140 associated with a classification scheme is a business entity that runs a flash sale website, the entity may specify that there are four stages included in the classification scheme, in which a set of actions associated with the first stage includes visiting the flash sale website, a set of actions associated with the second stage includes signing up for an account in the flash sale website, a set of actions associated with the third stage includes making a purchase in the flash sale website, and a set of actions associated with the fourth stage includes referring other individuals to the flash sale website.

In various embodiments, a number of stages included in a classification scheme and/or a set of actions associated with each stage of the classification scheme may be inferred by the online system 140 based on the information describing actions performed by individuals/users of the online system 140. In such embodiments, the online system 140 may infer these characteristics of the classification scheme by extracting information from the information describing actions performed by individuals/users of the online system 140 (e.g., the sequence in which the actions were performed, information describing the actions, etc.). For example, suppose that information describing actions associated with a business entity are associated with various names, such as "visiting a retail store" and "making a purchase at a retail store." In this example, based on the names of the actions and the order in which online system users performed the actions, the online system 140 may determine that users who visit a retail store associated with the business entity do not necessarily make a purchase at the retail store and that users who make a purchase at a retail store associated with the business entity must first visit the retail store. Continuing with this example, the online system 140 may then infer that these actions may be associated with different stages of a classification scheme associated with the business entity and that the classification scheme includes at least two stages, in which a first stage is associated with a set of actions including visiting a retail store associated with the business entity and a second stage is associated with actions including making a purchase at a retail store associated with the business entity.

In various embodiments, stages of a classification scheme may be ordered sequentially, such that each stage corresponds to a stage in a sequence of stages. In embodiments in which stages of a classification scheme are ordered sequentially, the stages may be ordered based on a degree of closeness of a relationship between online system users who are assigned to each stage, as described below, and a content-providing user of the online system 140 associated with the classification scheme. In one embodiment, a first stage of a classification scheme may correspond to a most distant relationship between online system users who are assigned to the first stage and a content-providing user associated with the classification scheme while a last stage of the classification scheme may correspond to a closest relationship between online system users who are assigned to the last stage and the content-providing user. For example, suppose that a classification scheme including three stages is associated with a non-profit organization, in which the first stage is associated with a set of actions including accessing a web page for the organization, the second stage is associated with a set of actions including signing a petition supporting a cause advocated by the organization, and the third stage is associated with a set of actions including performing volunteer work for the organization. In this example, the ordering of the stages and the set of actions associated with each stage indicate that there is a closer relationship between the organization and online system users who are assigned to the third stage than between the organization and online system users who are assigned to the second stage. Similarly, in this example, the ordering of the stages and the actions associated with the stages also indicate that there is a closer relationship between the organization and online system users who are assigned to the second stage than between the organization and online system users who are assigned to the first stage. In embodiments in which stages of a classification scheme are ordered sequentially, an ordering of the stages may be specified by a content-providing user of the online system 140 associated with the classification scheme. In the above example, the ordering of the stages may be specified by the non-profit organization.

In some embodiments, in addition to inferring characteristics of a classification scheme, such as a number of stages included in the classification scheme and/or a set of actions associated with each stage of the classification scheme, the online system 140 also may infer a sequence of the stages. For example, suppose that a set of actions associated with one stage of a classification scheme associated with a content-providing user of the online system 140 includes viewing a content item associated with the content-providing user, a set of actions associated with another stage of the classification scheme includes visiting a website for the content-providing user, and a set of actions associated with yet another stage of the classification scheme includes subscribing to a newsletter from the content-providing user. In this example, the online system 140 may extract information describing the number of online system users who performed each of the actions and a date and a time at which the online system users performed each of the actions from information describing actions performed by online system users. In the above example, the online system 140 may determine that the number of online system users who viewed the content item associated with the content-providing user is greater than the number of online system users who visited the website for the content-providing user and that the number of online system users who visited the website for the content-providing user is greater than the number of online system users who subscribed to the newsletter from the content-providing user. In this example, the online system 140 also may determine that at least a threshold percentage of online system users who performed all three actions viewed the content item before visiting the website and visited the website before subscribing to the newsletter. Continuing with this example, based on this information, the online system 140 may infer a sequence of the stages, such that a set of actions associated with a first stage in the sequence includes viewing a content item associated with the content-providing user, a set of actions associated with a second stage in the sequence includes visiting a website for the content-providing user, and a set of actions associated with a third stage in the sequence includes subscribing to a newsletter from the content-providing user.

In embodiments in which the online system 140 infers a number of stages included in a classification scheme, a set of actions associated with each stage of the classification scheme, and/or a sequence of the stages, the online system 140 may allow a content-providing user of the online system 140 associated with the classification scheme to modify one or more characteristics of the classification scheme. For example, once the online system 140 has inferred a number of stages included in a classification scheme, a set of actions associated with each of the stages, and a sequential order of the stages, the online system 140 may communicate information describing the classification scheme to a content-providing user of the online system 140 associated with the classification scheme. In this example, the content-providing user may then add or remove one or more of the stages, insert or delete one or more actions associated with one or more of the stages, or change the sequential order of the stages, and communicate information describing these changes to the online system 140.

The online system 140 may receive 304 information describing actions performed by various individuals. Examples of actions that may be performed by individuals include purchasing a product or a service, clicking on a content item, subscribing to a newsletter, checking-in to a physical location, registering to attend an event, expressing a preference for a content item, sharing a content item with other individuals, commenting on a content item, viewing a specific web page, etc. Individuals may perform actions that are internal to the online system 140. For example, an individual who is an online system user may share a content item presented by the online system 140 with other individuals who also are online system users by clicking on an interactive element presented in conjunction with the content item in a newsfeed associated with a user profile of the user maintained in the online system 140. Individuals also may perform actions that are external to the online system 140. For example, individuals may make purchases in third-party systems 130, such as e-commerce websites, or click on content items presented by content publishers that are external to the online system 140.

The online system 140 may receive 304 information describing actions performed by individuals from sources that are external to the online system 140. In some embodiments, sources that are external to the online system 140 from which the online system 140 may receive 304 information describing actions performed by individuals include tracking pixels and third-party systems 130. For example, the online system 140 may receive 304 information describing a download of an application from a third-party system 130 by an individual via a tracking pixel embedded into a download confirmation page presented by the third-party system 130. Alternatively, in the above example, the online system 140 may receive 304 information describing the download of the application by the individual from the third-party system 130 itself. In various embodiments, the online system 140 may receive 304 information describing actions performed by individuals from client devices 110 associated with the individuals. For example, the online system 140 may receive 304 information describing a visit to a physical location of a store by an individual if GPS coordinates received from a client device 110 associated with the individual correspond to the physical location of the store.

In some embodiments, the sources from which the online system 140 may receive 304 information describing actions performed by individuals also may include offline systems (e.g., point of sale systems, location and proximity tracking beacons, biometric systems, cameras, etc.). For example, the online system 140 may receive 304 information describing purchases made by individuals from point of sale systems and information describing the individuals' visits to physical locations via Bluetooth beacons. As an additional example, the online system 140 may receive 304 information indicating that an individual signed in to an application if their fingerprint was scanned by a client device 110 used to sign in to the application. As an additional example, the online system 140 also may receive 304 information indicating that an individual boarded a flight at an airport if their face was scanned by a biometric camera used as a security screening device at the airport.

In some embodiments, the online system 140 may receive 304 information describing an action performed by an individual in real-time. For example, upon completion of a questionnaire by an individual on a website for an online retailer, a web page is presented to the individual that thanks the individual for completing the questionnaire. In this example, the online system 140 may receive 304 information via a tracking pixel that is embedded into the web page, in which the information describes the completion of the questionnaire by the individual (e.g., the content of the questionnaire, responses provided by the individual, a time that the questionnaire was completed, an email address of the individual who completed the questionnaire, etc.).

Information about actions performed by individuals may include user-identifying information for the individuals. User-identifying information may include personally identifiable information, such as a full name, a home address, a phone number, an email address, a user identifier that is unique to the individual in the online system 140 or in a third-party system 130 (e.g., a username, a user identification number, or a cookie identifier), a client device identifier (e.g., an IP address), a browser identifier (e.g., a user agent), etc. For example, if an individual clicks on a content item (e.g., an advertisement) presented in a web page external to the online system 140, information received 304 by the online system 140 may include information identifying the content item and the web page, information indicating a time at which the individual clicked on the content item, information indicating that the individual clicked on the content item, and an IP address associated with a client device 110 used by the individual to click on the content item. In some embodiments, user-identifying information also may include additional types of information that potentially may be combined with other personal information to identify an individual, such as an age, a gender, a geographic region, etc. For example, user-identifying information for an individual may include a combination of the individual's first name, birthdate, hometown, and income level.

The online system 140 may identify 306 (e.g., using the user identification module 230) online system users included among the individuals. The online system 140 may identify 306 online system users based on user-identifying information included among information describing actions performed by various individuals. For example, suppose that the online system 140 receives 304 information indicating that an individual associated with a particular cookie identifier installed a particular mobile application for a third-party system 130. In this example, the online system 140 may compare the cookie identifier to cookie identifiers maintained in the online system 140 for various online system users and identify the individual as a user of the online system 140 upon determining that the cookie identifier matches a cookie identifier associated with the user.

In some embodiments, once the online system 140 has identified 306 an individual as an online system user, the online system 140 may store 308 (e.g., using the action logger 215) information describing one or more corresponding actions performed by the user in association with information identifying the user. For example, the online system 140 may store 308 information indicating that an online system user installed a game created by a particular game developer in association with a user profile of the online system user (e.g., in the user profile store 205). In the above example, the online system 140 also or alternatively may store 308 the information in the action log 220 in association with information identifying the user (e.g., a username or a user identification number). The online system 140 in the above example also or alternatively may store 308 the information in association with an edge that describes a relationship between the user and the game developer (e.g., in the edge store 225).

The online system 140 may compare 310 (e.g., using the stage assignment module 240) actions that have been performed by users of the online system 140 to different sets of actions associated with different stages of a classification scheme and assign 312 (e.g., using the stage assignment module 240) the users to the stages based on the comparison. In some embodiments, the online system 140 may assign 312 an online system user to a stage of the classification scheme if the user has performed at least a threshold number and/or at least a threshold percentage of a set of actions associated with the stage. For example, if a classification scheme is associated with a content-providing user of the online system 140 who is an application developer, a set of actions associated with a first stage may include installing an application developed by the application developer, while a set of actions associated with a second stage may include installing the application and using the application. In this example, if an online system user has installed the application, but has not used the application, the online system user may be assigned 312 to the first stage rather than to the second stage because the online system user has performed all (i.e., 100%) of the actions associated with the first stage, but has only performed some (i.e., 50%) of the actions associated with the second stage. In embodiments in which the classification scheme includes a default stage, online system users who have not performed at least a threshold number and/or at least a threshold percentage of a set of actions associated with each additional stage included in the classification scheme may be assigned 312 to the default stage. In the above example, if the classification scheme includes a default stage, an online system user who has not installed the application may be assigned 312 to the default stage.

In embodiments in which stages of the classification scheme correspond to a sequence of stages, the online system 140 also may assign 312 an online system user to a stage based at least in part on the sequence of the stages. For example, suppose that an online system user has performed every action associated with four out of five stages of a sequence of stages included in a classification scheme associated with an application developer, in which the stages are ordered based on a degree of closeness of a relationship between online system users who are assigned 312 to each stage and the application developer. In this example, the online system 140 may determine which of the four stages corresponds to a closest relationship between online system users who are assigned 312 to the stage and the application developer based on an ordering of the stages specified by the application developer. Continuing with this example, the online system 140 may then assign 312 the user only to one of the four stages corresponding to the closest relationship between online system users who have performed the set of actions associated with the stage and the application developer.

In some embodiments, the online system 140 may store 314 (e.g., in the edge store 225) information describing assignments of online system users to the stages of the classification scheme. In some embodiments, the online system 140 may store 314 information describing an assignment of an online system user to a stage in association with an edge that describes a relationship between the online system user and a content-providing user of the online system 140 associated with the classification scheme. For example, information stored 314 in association with an edge may indicate that an online system user has been assigned 312 to a stage of a classification scheme associated with a content-providing user of the online system 140, a type of relationship between the user and the content-providing user corresponding to the stage of the classification scheme, and a time at which the online system user was assigned 312 to the stage.

In some embodiments, the online system 140 may identify 316 (e.g., using the stage assignment module 240) attributes shared by online system users assigned 312 to a particular stage of the classification scheme. The online system 140 may identify 316 demographic information or other characteristics shared by online system users assigned 312 to each stage of the classification scheme. For example, the online system 140 may identify 316 hobbies or interests shared by at least a threshold percentage of online system users assigned 312 to a stage of a classification scheme.

Once the online system 140 has identified 316 attributes shared by online system users assigned 312 to each stage of the classification scheme, the online system 140 may communicate 318 this information to the content-providing user of the online system 140 associated with the classification scheme. For example, if a content-providing user of the online system 140 associated with a classification scheme is a game developer, the online system 140 may communicate 318 information to the game developer describing demographic information shared by online system users assigned 312 to each stage of the classification scheme. In this example, information communicated 318 to the content-providing user may indicate that 65% of online system users assigned 312 to a first stage of the classification scheme are male and that 35% of online system users assigned 312 to the first stage are female, that 75% of online system users assigned 312 to a second stage of the classification scheme are male and that 25% of online system users assigned 312 to the second stage are female, etc. In the above example, information communicated 318 to the content-providing user also may indicate that 30% of online system users assigned 312 to the first stage of the classification scheme most recently played the game over one year ago and that 70% of online system users assigned 312 to the first stage most recently played the game within the last year, that 15% of online system users assigned 312 to a second stage of the classification scheme most recently played the game over one year ago and that 85% of online system users assigned 312 to the second stage most recently played the game within the last year, etc.

The online system 140 may receive 320 one or more content items associated with one or more stages of the classification scheme from the content-providing user. A content item received 320 from the content-providing user may be associated with a stage of the classification scheme associated with the content-providing user. For example, suppose that a classification scheme is associated with a content-providing user of the online system 140 who is an application developer. In this example, the online system 140 may receive 320 content items from the application developer associated with stages of the classification scheme, such that a first set of content items is associated with a first stage of the classification scheme, a second set of content items is associated with a second stage of the classification scheme, etc.

A content item that is associated with a stage may be eligible for presentation to users of the online system 140 who have been assigned 312 to the stage. For example, suppose that in a classification scheme associated with a content-providing user of the online system 140 who is an application developer, online system users who have not installed an application developed by the application developer are assigned 312 to a first stage of the classification scheme, users who have installed the application, but infrequently use the application (e.g., less than once per week) are assigned 312 to a second stage of the classification scheme, and users who have installed the application and frequently use the application are assigned 312 to a third stage of the classification scheme. In this example, the online system 140 may receive 320 content items from the application developer that are associated with the stages, such that a first set of content items associated with the first stage includes promotions for first-time installers, a second set of content items associated with the second stage includes promotions for users who use the application at least once per week, and a third set of content items associated with the third stage includes promotions for users who install a new application developed by the application developer.

In various embodiments, an association between a content item received 320 from the content-providing user of the online system 140 and a stage of a classification scheme associated with the content-providing user may be described in a set of targeting criteria associated with the content item that describe one or more attributes for online system users eligible to be presented with the content item. In such embodiments, online system users eligible to be presented with the content item may include users who have been assigned 312 to the stage of the classification scheme. In some embodiments, attributes for online system users eligible to be presented with a content item may correspond to actions that have been performed by the users. For example, a content item that is associated with a stage of a classification scheme may be associated with a set of targeting criteria that describe a set of actions that have been performed by users of the online system 140 assigned 312 to the stage. In some embodiments, targeting criteria associated with a content item may specify other attributes (e.g., demographic information) for online system users eligible to be presented with the content item. For example, if a content-providing user of the online system 140 owns a casino, a content item received 320 from the content-providing user may be associated with targeting criteria specifying a minimum age, such that online system users who have been assigned 312 to a stage of a classification scheme associated with the content-providing user are eligible to be presented with the content item if user profiles for the users maintained in the online system 140 indicate that the users are at least the minimum age.

In some embodiments, once the online system 140 receives 320 the content item(s) from the content-providing user, the online system 140 may store 322 the content items (e.g., in the content store 210). For example, suppose that a classification scheme is associated with a content-providing user of the online system 140 who is an online retailer. In this example, the online system 140 may receive 320 content items from the online retailer associated with stages of the classification scheme, such that a first set of content items is associated with a first stage of the classification scheme, a second set of content items is associated with a second stage of the classification scheme, etc. Continuing with this example, the online system 140 may store 322 a set of objects representing the first set of content items in the content store 210 in association with information identifying the first stage of the classification scheme. In the above example, the online system 140 also may store 322 an additional set of objects representing the second set of content items in the content store 210 in association with information identifying the second stage of the classification scheme, etc.

The online system 140 may identify 324 an opportunity to present content to an online system user assigned 312 to a stage of the classification scheme. For example, the online system 140 may identify 324 an opportunity to present content to an online system user assigned 312 to a stage of a classification scheme upon receiving a request from the user to access a user profile page associated with the user, in which the user profile page includes a newsfeed in which various content items may be presented. As an additional example, the online system 140 may identify 324 an opportunity to present content to an online system user assigned 312 to a stage of a classification scheme upon receiving a request to present a web page maintained in the online system 140 to the user, in which the web page includes a scrollable unit in which advertisements and other types of content items may be presented.

Upon identifying 324 an opportunity to present content to an online system user assigned 312 to a stage of the classification scheme, the online system 140 may select 326 (e.g., using the content selection module 270) one or more content items for presentation to the user. The online system 140 may select 326 one or more content items for presentation to the user by identifying a set of candidate content items eligible for presentation to an online system user who has been assigned 312 to a stage of a classification scheme and selecting 326 one or more of the candidate content items for presentation to the user. For example, upon identifying 324 an opportunity to present a content item to a user of the online system 140 assigned 312 to a stage of a classification scheme, the online system 140 may identify a set of candidate content items eligible for presentation to the user, in which the set of candidate content items includes one or more content items associated with the stage. In some embodiments, the online system 140 may rank candidate content items based at least in part on a value associated with each candidate content item and select 326 one or more content items having the highest values for presentation to the user. In the above example, the online system 140 may rank the candidate content items based at least in part on a bid amount associated with each candidate content item. Continuing with this example, the online system 140 may then select 326 one or more of the candidate content items for presentation to the user based at least in part on the ranking.

In some embodiments, a value associated with a candidate content item may correspond to a score computed by the online system 140 that indicates a predicted affinity of an online system user for the candidate content item. For example, the online system 140 may compute an affinity score for each candidate content item eligible for presentation to a user that indicates a predicted affinity of the user for the candidate content item. Continuing with this example, the online system 140 may then rank the candidate content items based at least in part on a bid amount and/or the affinity score associated with each candidate content item and select 326 one or more of the candidate content items for presentation to the user based at least in part on the ranking.

Once the online system 140 has selected 326 one or more content items for presentation to the user, the online system 140 may generate 328 (e.g., using the user interface module 275) a user interface in which to present the selected content items. In some embodiments, the user interface generated 328 by the online system 140 may include a feed of content items in which one or more content items selected 326 by the online system 140 may be presented. For example, the online system 140 may generate 328 a newsfeed associated with a user profile of an online system user, in which the newsfeed includes multiple content items, such as advertisements, videos, images, text, etc. The user interface also may include a set of interactive elements (e.g., buttons) that each correspond to an option associated with a content item that may be selected by a user. Examples of options include an option to express a preference for a content item, an option to share the content item with additional online system users, and an option to comment on the content item. For example, if an online system user presented with a content item clicks on a button corresponding to an option to express a preference for the content item, other online system users to whom the user is connected may receive a notification that the user has expressed a preference for the content item.

The online system 140 may present 330 the selected 326 content item(s) to the user. For example, if the online system 140 generates 328 a user interface that includes one or more content items selected 326 for presentation to a user of the online system 140, the online system 140 may send the user interface for display to the user. In this example, the online system 140 may send the user interface for display to the user in a display area of a client device 110 associated with the user.

The online system 140 may reassign 312 (e.g., using the stage assignment module 240) an online system user from one stage of the classification scheme to another stage of the classification scheme based on information received 304 by the online system 140 describing actions performed by the user. For example, after the online system 140 has assigned 312 an online system user to a stage of a classification scheme, the action logger 215 subsequently may receive 304 information describing actions internal to or external to the online system 140 performed by the user. In this example, based on the received 304 information, the online system 140 may reassign 312 the user to a different stage of the classification scheme.

In embodiments in which the classification scheme corresponds to a sequence of stages, a user may advance to a succeeding stage of the classification scheme upon reassignment of the user to a stage that follows the stage to which they were assigned 312 based on information received 304 by the online system 140 describing actions performed by the user that indicate a change in the user's relationship to the content-providing user of the online system 140 associated with the classification scheme. For example, suppose that in a sequence of stages associated with a content-providing user of the online system 140 who is a musician, a first stage corresponds to users who have never listened to music by the musician, a second stage corresponds to users who have listened to music by the musician, a third stage corresponds to users who have downloaded music by the musician, and a fourth stage corresponds to users who have recommended music by the musician to others. In this example, an online system user who has listened to music by the musician may advance from the first stage to the second stage when the online system 140 receives 304 information from an online digital media store indicating that the user has listened to music by the musician. In some embodiments, an online system user may advance through more than one stage of a sequence of stages at one time. In the above example, the online system user who has listened to music by the musician may advance from the second stage to the fourth stage when the online system 140 receives 304 information from the online digital media store indicating that the user has requested to recommend music by the musician to others. In some embodiments, if the online system 140 reassigns 312 an online system user from a first stage of a classification scheme to a second stage of the classification scheme, information describing the reassignment may be stored 314 in association with a new edge (e.g., in the edge store 225). Alternatively, information describing the reassignment may be stored 314 in association with an existing edge describing the assignment of the online system user to the first stage of the classification scheme.

Figure 4:
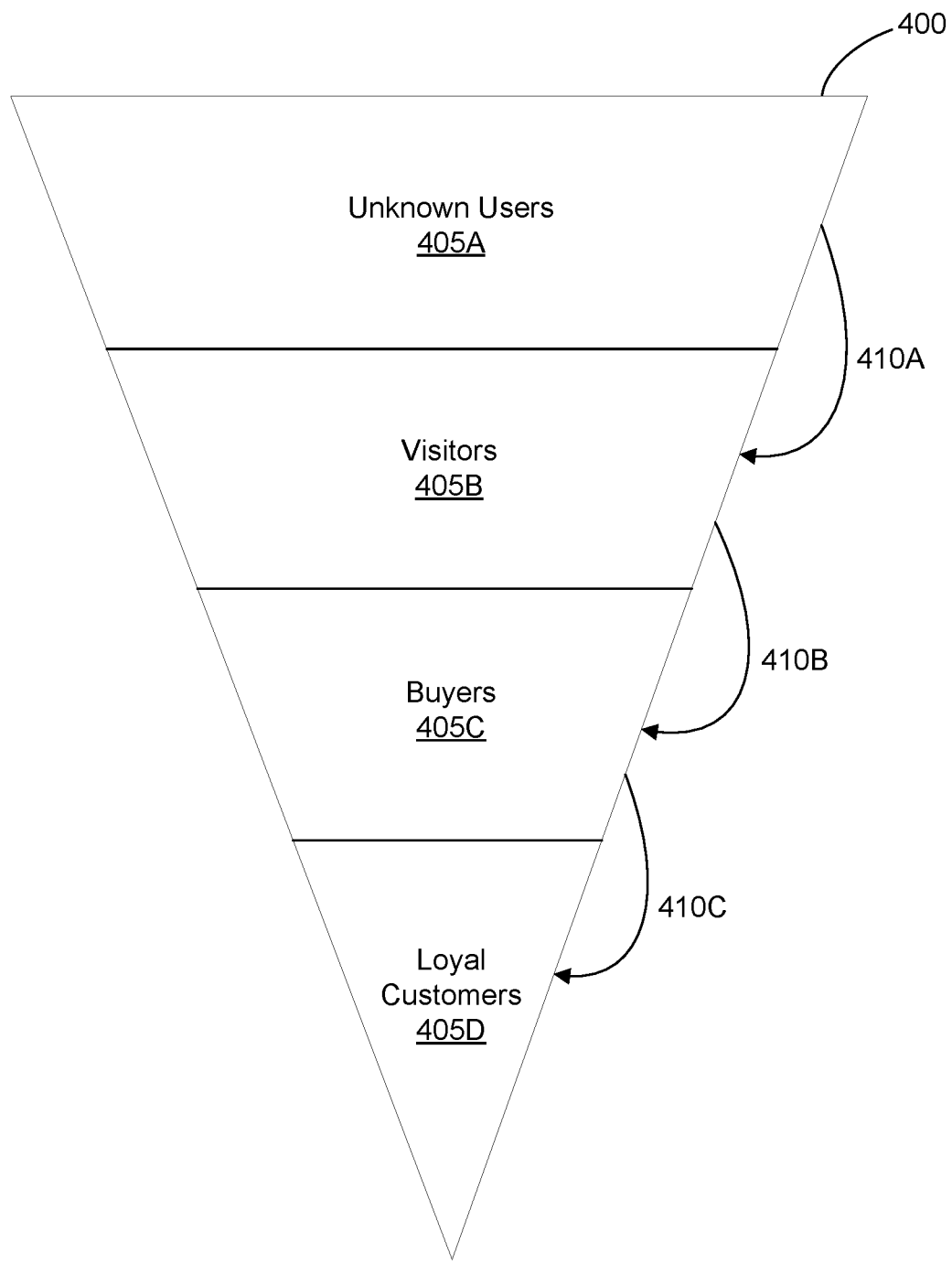
FIG. 4 is a conceptual diagram of stages of a classification scheme associated with a content-providing user of an online system, in accordance with an embodiment.

As shown in the example of FIG. 4, a classification scheme 400 associated with a content-providing user of the online system 140 who is an online retailer corresponds to a sequence of four stages 405. Online system users who are unknown to the online retailer (e.g., online system users who have never visited a website for the online retailer) may be assigned 312 to the first stage 405A of the classification scheme 400, online system users who have visited a website for the online retailer may be assigned 312 to the second stage 405B of the classification scheme 400, online system users who have made a purchase in the website for the online retailer may be assigned 312 to the third stage 405C of the classification scheme 400, and online system users who are loyal customers of the online retailer may be assigned 312 to the fourth stage 405D of the classification scheme 400.

Referring still to FIG. 4, an online system user who is assigned 312 to the first stage 405A of the classification scheme 400 may advance 410A to the second stage 405B of the classification scheme 400 when the online system 140 receives 304 information (e.g., via a pixel embedded into a web page of the website for the online retailer) indicating that the user has visited the website for the online retailer and the online system 140 reassigns 312 the user to the second stage 405B. Similarly, an online system user who is assigned 312 to the second stage 405B of the classification scheme 400 may advance 410B to the third stage 405C of the classification scheme 400 when the online system 140 receives 304 information (e.g., via a pixel embedded into a purchase confirmation page) indicating that the user has made a purchase in the website for the online retailer and the online system 140 reassigns 312 the user to the third stage 405C. Finally, an online system user who is assigned 312 to the third stage 405B of the classification scheme 400 may advance 410C to the fourth stage 405D of the classification scheme 400 when the online system 140 receives 304 information (e.g., via a pixel embedded into a purchase confirmation page) over a specified time period indicating that the user has made at least a threshold number of purchases in the website for the online retailer and the online system 140 reassigns 312 the user to the fourth stage 405D.

Referring back to FIG. 3, in some embodiments, the classification scheme may be associated with a comprehensive value received 332 from the content-providing user of the online system 140 associated with the classification scheme. In some embodiments, the comprehensive value received 332 from the content-providing user may correspond to a budget. For example, the online system 140 may receive 332 a budget from a content-providing user of the online system 140 associated with a classification scheme, in which the content-providing user is an advertiser. In this example, the budget may be used to pay for each presentation of an advertisement associated with a stage of the classification scheme to online system users assigned 312 to the stage. In various embodiments, a comprehensive value received 332 from a content-providing user of the online system 140 may be associated with a specified amount of time (e.g., a budget for a campaign lasting six months). For example, if a content-providing user of the online system 140 is an advertiser, the online system 140 may receive 332 a budget from the advertiser for presenting one or more advertisements received 320 from the advertiser to online system users over a period of three months.

The online system 140 may determine 334 (e.g., using the expected return module 245) an expected return value associated with a stage of the classification scheme. An expected return value associated with a stage of the classification scheme may correspond to a monetary profit, a number of installations of an application, a number of social media followers, or any other suitable type of value that potentially may be gained by the content-providing user of the online system 140 associated with the classification scheme from online system users assigned 312 to the stage. In some embodiments, the online system 140 may determine 334 an expected return value associated with a stage of the classification scheme based on historical values that the content-providing user of the online system 140 associated with the classification scheme gained from online system users assigned 312 to the stage. For example, the online system 140 may determine an average of historical values gained by a content-providing user associated with a classification scheme from online system users assigned 312 to a stage of the classification scheme. In this example, the online system 140 may then determine 334 an expected return value associated with this stage by multiplying the average of the historical values by the total number of online system users currently assigned 312 to the stage. Continuing with this example, the online system 140 may repeat this process to determine 334 an expected return value associated with each additional stage of the classification scheme.

In some embodiments, the online system 140 may take into account multiple stages to which online system users assigned 312 to a stage of the classification scheme may advance when determining 334 an expected return value associated with the stage. In such embodiments, the online system 140 may determine 334 an expected return value associated with a stage based on a likelihood that one or more online system users currently assigned 312 to the stage will advance to one or more succeeding stages. For example, the online system 140 may determine a product of an average of historical values gained by a content-providing user associated with a classification scheme from online system users assigned 312 to a stage of the classification scheme and the total number of online system users currently assigned 312 to the stage. In this example, the online system 140 also may determine a number of the online system users currently assigned 312 to the stage who are likely to advance to a succeeding stage by multiplying the number of online system users currently assigned 312 to the stage by a likelihood that these users will advance to a succeeding stage (e.g., predicted by the online system 140, as described below). Continuing with this example, the online system 140 may repeat this process for each succeeding stage in the classification scheme based on the number of online system users who are likely to advance to the stage. In this example, the online system 140 may then determine 334 an expected return value associated with the stage as a sum of the products determined for the stage and for each succeeding stage of the classification scheme.

The online system 140 may predict 336 (e.g., using the cost prediction module 250) a potential cost associated with an advancement of one or more online system users assigned 312 to a stage of a classification scheme to a succeeding stage of the classification scheme. A potential cost associated with an advancement of an online system user assigned 312 to a stage of a classification scheme to a succeeding stage of the classification scheme may correspond to a value (e.g., an amount of time or a monetary amount) that a content-providing user of the online system 140 associated with the classification scheme potentially may assume (e.g., by investing or foregoing the value) before the online system user will advance to the succeeding stage. For example, suppose that a classification scheme associated with a content-providing user of the online system 140 who is an application developer includes two stages, in which a first stage corresponds to online system users who have installed an application, but who have not made any purchases in the application, and a second stage corresponds to online system users who have installed the application and have made at least one purchase in the application. In this example, for the first stage, a potential cost that may be assumed by the application developer may correspond to a potential monetary amount the application developer may invest before a user assigned 312 to the first stage makes a purchase in the application (e.g., an amount the application developer may spend on advertisements for the application and/or a profit margin the application developer may sacrifice by offering promotions to make purchases in the application).

The online system 140 may predict 336 a potential cost associated with an advancement of one or more online system users assigned 312 to a stage of a classification scheme to a succeeding stage of the classification scheme using a model (e.g., a machine-learning model). In such embodiments, the online system 140 may train the model using information describing costs associated with historical actions performed by online system users, in which the actions are associated with one or more content-providing users of the online system 140. For example, the online system 140 may train a machine-learning model using information describing previous costs, such as amounts of time elapsed or monetary amounts that one or more content-providing users of the online system 140 assumed (e.g., by investing or foregoing the value) before online system users performed various actions associated with the content-providing user(s).

Once the model has been trained, the online system 140 may use the model to predict 336 a potential cost associated with an advancement of an online system user who has been assigned 312 to a stage of the classification scheme to a succeeding stage of the classification scheme. For example, the online system 140 may use a model to predict 336 a potential cost that a content-providing user of the online system 140 associated with a classification scheme may assume before an online system user who has been assigned 312 to a stage of the classification scheme will perform one or more actions corresponding to a succeeding stage. In this example, the model may predict 336 the potential cost based on information describing historical actions performed by online system users having at least a threshold measure of similarity to the user and/or based on information describing historical actions performed by online system users, in which the actions are associated with one or more content-providing users of the online system 140 having at least a threshold measure of similarity to a content-providing user associated with the classification scheme. Continuing with this example, the online system 140 may then predict 336 that the potential cost that the content-providing user may assume before the user will advance to the succeeding stage of the classification scheme is equal to the potential cost predicted 336 by the model.

The online system 140 may predict 338 (e.g., using the advancement prediction module 255) a likelihood that one or more online system users who are assigned 312 to a stage of a classification scheme will advance to a succeeding stage of the classification scheme. In some embodiments, the online system 140 may predict 338 a likelihood that one or more online system users who are assigned 312 to a stage of a classification scheme will advance to a succeeding stage of the classification scheme based on historical information indicating that online system users assigned 312 to the stage advanced to the succeeding stage. For example, based on historical information maintained in the online system 140 (e.g., in the edge store 225), the online system 140 may determine a percentage of online system users assigned 312 to a stage of a classification scheme who advanced to a succeeding stage of the classification scheme. In this example, the online system 140 may then predict 338 that a likelihood that one or more online system users who are assigned 312 to the stage of the classification scheme will advance to the succeeding stage of the classification scheme is equal to the percentage.

The online system 140 may predict 338 a likelihood that one or more online system users who are assigned 312 to a stage of the classification scheme will advance to a succeeding stage of the classification scheme using a model (e.g., a machine-learning model). In such embodiments, the online system 140 may train the model using information describing historical actions performed by online system users, in which the actions are associated with one or more content-providing users of the online system 140. For example, the online system 140 may train a machine-learning model using information describing previous clicks on content items associated with various content-providing users, previous purchases made in association with presentations of content items associated with the content-providing users, and other actions associated with the content-providing users previously performed by online system users.

In embodiments in which the online system 140 predicts 338 a likelihood that one or more online system users who are assigned 312 to a stage of the classification scheme will advance to a succeeding stage of the classification scheme using a model, the online system 140 also may train the model using historical information describing the lifetimes of relationships between online system users and content-providing users of the online system 140. For example, the online system 140 may identify online system users whose most recent actions associated with one or more content-providing users were performed over two years ago. In this example, for each identified user, the online system 140 may determine a lifetime of a relationship between the user and each content-providing user as a difference between the time that the most recent action was performed and the time that the user performed their first action associated with the content-providing user. Continuing with this example, the online system 140 may train the machine-learning model using the determined lifetimes.

Once the model has been trained, the online system 140 may use the model to predict 338 a likelihood that an online system user who has been assigned 312 to a stage of the classification scheme will advance to a succeeding stage of the classification scheme. For example, the online system 140 may use the model to predict 338 a likelihood that an online system user who has been assigned 312 to a stage of a classification scheme will perform one or more actions corresponding to a succeeding stage. In this example, the model may predict 338 the likelihood that the user will perform the action(s) based on information describing historical actions performed by online system users having at least a threshold measure of similarity to the user and/or based on information describing historical actions performed by online system users, in which the actions are associated with one or more content-providing users of the online system 140 having at least a threshold measure of similarity to a content-providing user associated with the classification scheme. In this example, the model also may predict 338 the likelihood that the user will perform the action(s) based on a predicted lifetime of the relationship between the user and the content-providing user. Continuing with this example, the online system 140 may then predict 338 that the likelihood that the user will advance to the succeeding stage of the classification scheme is equal to the likelihood predicted 338 by the model.

The online system 140 may determine 340 (e.g., using the expected advancement module 260) an expected advancement value associated with an advancement of an online system user assigned 312 to a stage of the classification scheme to a succeeding stage of the classification scheme. An expected advancement value may indicate a value associated with an advancement of an online system user from a stage of the classification scheme to a succeeding stage of the classification scheme that may be gained by the content-providing user of the online system 140 associated with the classification scheme. In some embodiments, the online system 140 may determine 340 an expected advancement value based at least in part on an expected return value associated with one or more stages of the classification scheme, on a predicted likelihood that one or more online system users assigned 312 to a stage of the classification scheme will advance to one or more succeeding stages of the classification scheme, and/or on a cost associated with the advancement.

To illustrate an example of how the online system 140 may determine 340 an expected advancement value associated with an online system user assigned 312 to a stage of a classification scheme, suppose that an expected return value associated with a first stage of the classification scheme is $50,000, that an expected return value associated with a second stage of the classification scheme is $100,000, that an expected return value associated with a third stage of the classification scheme is $250,000, and that there are 10,000 online system users assigned 312 to each stage. Suppose also that a likelihood that an online system user assigned 312 to the first stage will advance to the second stage is 50% and that a likelihood that an online system user assigned 312 to the second stage will advance to the third stage is 25% and that an average cost of $1.50 is associated with each advancement. The online system 140 may first divide the expected return value associated with the first stage of the classification scheme by the number of online system users assigned 312 to this stage, repeat this process for the second stage, and determine a difference between the quotients to obtain an expected return value associated with an advancement of a user assigned 312 to the first stage to the second stage (i.e., ($100,000/10,000)−($50,000/10,000)=$5). The online system 140 may then repeat the process to obtain an expected return value associated with an advancement of a user assigned 312 to the second stage to the third stage (i.e., ($250,000/10,000)+($100,000/10,000)=$15). For each possible advancement, the online system 140 may determine a product of the expected return value associated with the advancement and the probability of the advancement. The online system 140 may subtract the cost of each advancement from a sum of the products to determine 340 an expected advancement value associated with an online system user assigned 312 to the first stage, such that the expected advancement value is $3.25 (i.e.,

[($5×0.5)+($15×0.25)]−($1.50×2)]). The online system 140 may subtract the cost of advancement from the second stage to the third stage from the product of the expected return value associated with the advancement of a user assigned 312 to the second stage to the third stage and the probability of this advancement, such that the expected advancement value associated with an online system user assigned 312 to the second stage is $2.25 (i.e., ($15×0.25)−$1.50).

The online system 140 may determine 342 (e.g., using the value determination module 265) a value (e.g., a bid amount) associated with a content item received 320 from the content-providing user of the online system 140 associated with the classification scheme. The online system 140 may determine 342 the value associated with the content item based on a comprehensive value received 332 from the content-providing user of the online system 140 from whom the content item was received 320 and/or based on an expected advancement value associated with a stage of the classification scheme associated with the content-providing user. For example, suppose that the online system 140 determines 340 that an expected advancement value from a first stage to a second stage of a classification scheme is $8 per user and that an expected advancement value from the second stage to a third stage of the classification scheme is $4 per user. In this example, if the online system 140 receives 332 a budget and a content item associated with each stage from the content-providing user of the online system 140, since the online system 140 has determined 340 that the expected advancement value from the first stage to the second stage is twice the expected advancement value from the second stage to the third stage, the online system 140 may determine 342 a bid amount associated with each content item based on the budget, such that the bid amount for the content item associated with the first stage is twice the bid amount for the content item associated with the second stage.

In some embodiments, the online system 140 also may determine 342 a value associated with a content item based on a quality associated with the content item, based on targeting criteria associated with the content item, based on a number of online system users assigned 312 to each stage of the classification scheme associated with the content item, based on a number of impressions of the content item specified by the content-providing user associated with the content item, or based on any other suitable types of information. For example, the online system 140 may determine 342 higher values associated with content items that are higher quality than for content items that are lower quality. As an additional example, if a content-providing user associated with a content item requests that 2,000 impressions of the content item be achieved within one month, the online system 140 may determine 342 a higher value associated with the content item than if the content-providing user associated with the content item requested that 200 impressions of the content item be achieved within one month.

In various embodiments, the online system 140 may adjust a value associated with a content item to adjust a rate at which the content item is selected for presentation to online system users eligible to be presented with the content item. The online system 140 may adjust a value associated with a content item based on a comprehensive value received 332 from a content-providing user from whom the content item was received 320. For example, suppose that the online system 140 receives 332 a budget from a content-providing user of the online system 140, in which the budget is associated with a content item and a time period in which the budget is to be used. In this example, to ensure that the entire budget is used by the end of the time period and that the budget is not exceeded, the online system 140 may pace the presentation of the content item by adjusting a bid amount associated with the content item. In the above example, the online system 140 may increase the bid amount to increase the rate at which the content item is selected for presentation to online system users and decrease the bid amount to decrease the rate at which the content item is selected for presentation to online system users.

The online system 140 may generate 344 (e.g., using the user interface module 275) a report that shows how one or more online system users assigned 312 to stages of the classification scheme have advanced through the stages. For example, the online system 140 may generate 344 a report including various charts and/or graphs that show a number of online system users assigned 312 to each stage of a sequence of stages corresponding to a classification scheme and how the numbers change over time. As an additional example, the online system 140 may generate 344 a report that describes an average amount of time it takes for online system users assigned 312 to each stage of a classification scheme to progress to a succeeding stage of the classification scheme. In some embodiments, the report may include benchmarks associated with the stages. For example, if a content-providing user of the online system 140 associated with a classification scheme is a game developer, the online system 140 may generate 344 a report that shows how online system users have advanced through stages of the classification scheme. In this example, the report also may include benchmarks describing an average rate of advancement of online system users assigned 312 to similar stages of classification schemes associated with other content-providing users of the online system 140 who also are game developers. The report also may include information identifying a set of content items associated with each stage of the classification scheme or any other suitable information that may be relevant to a content-providing user associated with the classification scheme.

Figure 5:
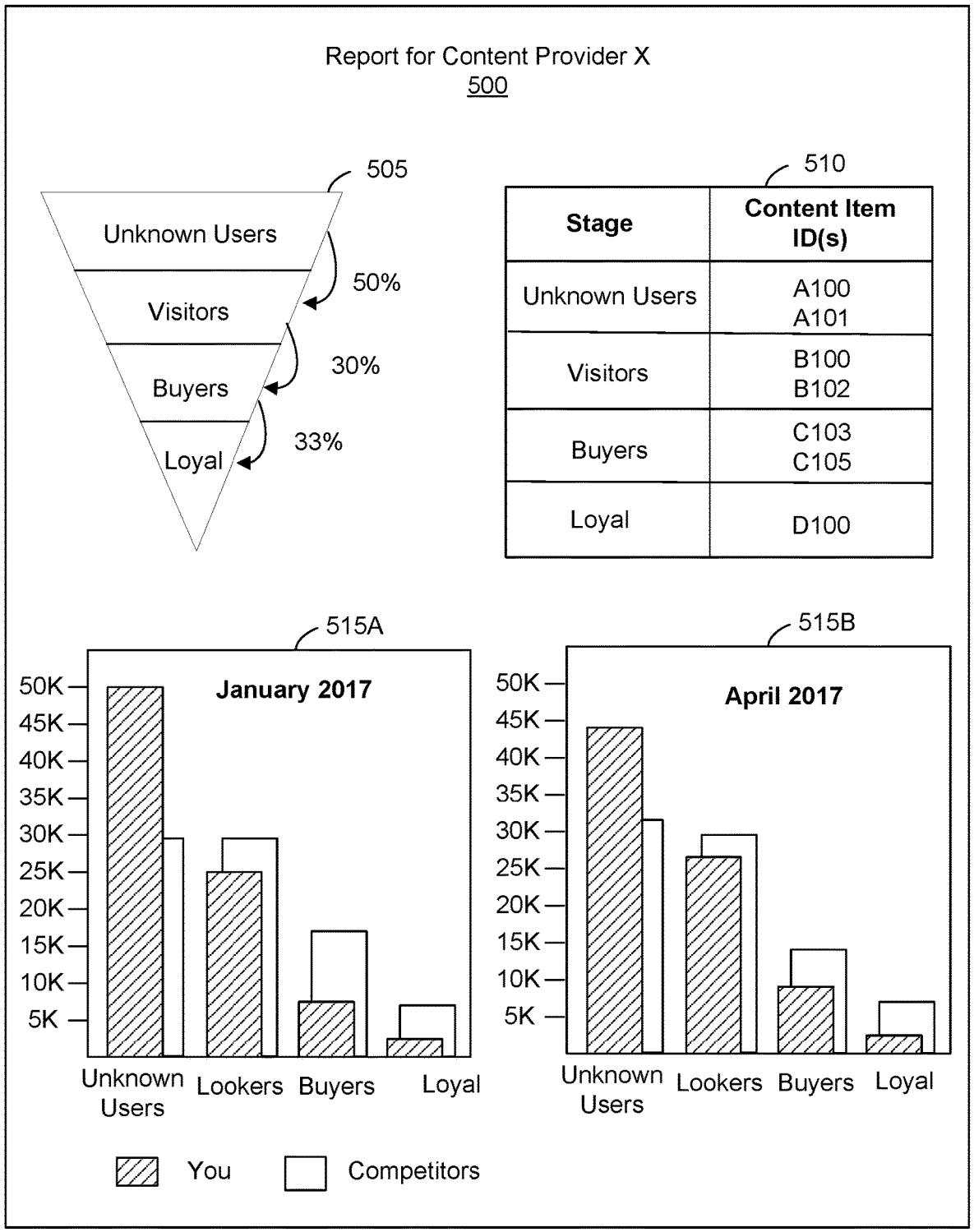
FIG. 5 is an example report associated with a classification scheme associated with a content-providing user of an online system, in accordance with an embodiment.

As shown in the example of FIG. 5, a report 500 generated 344 by the online system 140 associated with a content-providing user of the online system 140 (Content Provider X) includes a diagram 505 that shows a percentage of online system users assigned 312 to each stage of a classification scheme associated with Content Provider X who are likely to advance to each succeeding stage of the classification scheme. The diagram 505 shows that of the online system users unknown to Content Provider X, 50% are likely to visit a website associated with Content Provider X. The diagram 505 also shows that of the online system users who have visited the website associated with Content Provider X, 30% are likely to make a purchase in the website associated with Content Provider X. Finally, the diagram 505 also shows that of the online system users who have made a purchase in the web site associated with Content Provider X, 33% are likely to become loyal customers of Content Provider X.

The report 500 shown in FIG. 5 also includes a table 510 that identifies content items associated with each stage of the classification scheme. For example, two content items (i.e., Content Item IDs A100 and A101) are associated with the first stage of the classification scheme, two content items (i.e., Content Item IDs B100 and B102) are associated with the second stage of the classification scheme, etc. The report 500 depicted in the example of FIG. 5 also includes bar graphs 515 showing a number of online system users assigned 312 to each stage of the classification scheme during different time periods (e.g., in January 2017 and in April 2017). Furthermore, the graphs 515 also include benchmarks describing an average number of online system users assigned 312 to each stage of similar classification schemes associated with competitors of Content Provider X during the same time periods.

Referring again to FIG. 3, once the online system 140 has generated 344 a report that shows how online system users assigned to stages of the classification scheme have advanced through the stages, the online system 140 may communicate 346 the report to the content-providing user of the online system 140 associated with the classification scheme.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
maintaining, in an online system, a classification scheme associated with a content-providing user of the online system, the classification scheme comprising a plurality of stages having a sequential order, wherein each of the plurality of stages is associated with a different content item received from the content-providing user;
receiving information describing a set of actions performed by an individual, the information describing the set of actions comprising user-identifying information for the individual;
determining whether the received user-identifying information for the individual matches at least some user-identifying information maintained in the online system for a user of the online system;
responsive to determining at least some of the received user-identifying information for the individual matches at least some of the maintained user-identifying information for the user of the online system, comparing the information describing the set of actions performed by the individual to an additional set of actions associated with each of the plurality of stages comprising the classification scheme;
assigning the user of the online system to a stage of the plurality of stages comprising the classification scheme based at least in part on the comparison;
determining an expected return value associated with the stage, the expected return value indicating a potential value to be gained from a set of online system users assigned to the stage;
determining an expected advancement value indicating a value associated with a reassignment of the user to one or more succeeding stages that follow the stage according to the sequential order of the plurality of stages, the expected advancement value based at least in part on one or more of: the expected return value associated with the stage, a potential cost associated with the reassignment, and a likelihood of the reassignment;
adjusting pacing values for one or more content items associated with the stage and the one or more succeeding stages based on corresponding expected advancement values, wherein the pacing values represent rates at which the one or more content items are selected for presentation;
selecting a content item from the one or more content items for presentation to the user based in part on the adjusted pacing values; and
presenting the selected content item to the user in a newsfeed of the online system.

2. The method of claim 1, further comprising:
receiving a comprehensive value from the content-providing user of the online system, the comprehensive value associated with one or more of the plurality of stages of the classification scheme;
receiving a content item associated with the stage from the content-providing user of the online system; and
determining a pacing value associated with the content item based at least in part on the comprehensive value received from the content-providing user of the online system and on the expected advancement value.

3. The method of claim 2, wherein an association between the content item and the stage is described in a set of targeting criteria associated with the content item.

4. The method of claim 1, further comprising:
receiving additional information describing one or more actions performed by the user of the online system, the one or more actions associated with the content-providing user of the online system;
comparing the received additional information describing the one or more actions performed by the user of the online system to the additional set of actions associated with each of the one or more succeeding stages that follow the stage according to the sequential order of the plurality of stages; and
responsive to determining that the received additional information describing the one or more actions performed by the user of the online system satisfy at least a threshold number of the additional set of actions associated with a succeeding stage of the one or more succeeding stages, reassigning the user of the online system to the succeeding stage.

5. The method of claim 4, wherein receiving the additional information describing the one or more actions performed by the user of the online system comprises:
receiving a content item associated with the stage from the content-providing user of the online system;
presenting the content item to the user of the online system; and
receiving the additional information describing the one or more actions performed by the user of the online system, wherein the one or more actions are associated with the content item.

6. The method of claim 1, further comprising:
predicting the potential cost associated with the reassignment; and
predicting the likelihood of the reassignment.

7. The method of claim 6, wherein one or more of the potential cost associated with the reassignment and the likelihood of the reassignment are predicted by a machine-learning model.

8. The method of claim 7, further comprising:
training the machine-learning model based at least in part on a set of historical actions performed by the set of online system users assigned to the stage.

9. The method of claim 1, wherein assigning the user of the online system to the stage of the plurality of stages based at least in part on the comparison comprises:
assigning the user of the online system to the stage of the plurality of stages responsive to determining that the information describing the set of actions performed by the individual satisfies at least a threshold number of the additional set of actions associated with the stage.

10. The method of claim 1, wherein the sequential order of the plurality of stages is based at least in part on a degree of closeness of a relationship between online system users assigned to each of the plurality of stages and the content-providing user of the online system.

11. The method of claim 10, wherein assigning the user of the online system to the stage of the plurality of stages is further based at least in part on the degree of closeness of the relationship between online system users assigned to each of the plurality of stages and the content-providing user of the online system.

12. The method of claim 1, further comprising:
generating a report indicating the reassignment of the user to the one or more succeeding stages that follow the stage according to the sequential order of the plurality of stages; and
communicating the report to the content-providing user of the online system.

13. The method of claim 1, further comprising:
inferring one or more characteristics of the classification scheme based at least in part on the information describing the set of actions performed by the individual, wherein the one or more characteristics of the classification scheme are selected from the group consisting of: a number of the plurality of stages comprising the classification scheme, the additional set of actions associated with each of the plurality of stages comprising the classification scheme, and the sequential order of the plurality of stages.

14. A computer program product comprising a non-transitory computer readable storage medium having instructions encoded thereon that, when executed by a processor, cause the processor to:
maintain, in an online system, a classification scheme associated with a content-providing user of the online system, the classification scheme comprising a plurality of stages having a sequential order, wherein each of the plurality of stages is associated with a different content item received from the content-providing user;
receive information describing a set of actions performed by an individual, the information describing the set of actions comprising user-identifying information for the individual;
determine whether the received user-identifying information for the individual matches at least some user-identifying information maintained in the online system for a user of the online system;
responsive to determining at least some of the received user-identifying information for the individual matches at least some of the maintained user-identifying information for the user of the online system, compare the information describing the set of actions performed by the individual to an additional set of actions associated with each of the plurality of stages comprising the classification scheme;
assign the user of the online system to a stage of the plurality of stages comprising the classification scheme based at least in part on the comparison;
determine an expected return value associated with the stage, the expected return value indicating a potential value to be gained from a set of online system users assigned to the stage;
determine an expected advancement value indicating a value associated with a reassignment of the user to one or more succeeding stages that follow the stage according to the sequential order of the plurality of stages, the expected advancement value based at least in part on one or more of: the expected return value associated with the stage, a potential cost associated with the reassignment, and a likelihood of the reassignment;
adjust pacing values for one or more content items associated with the stage and the one or more succeeding stages based on corresponding expected advancement values, wherein the pacing values represent rates at which the one or more content items are selected for presentation;

select a content item from the one or more content items for presentation to the user based in part on the adjusted pacing values; and present the selected content item to the user in a newsfeed on the online system.

15. The computer program product of claim 14, wherein the non-transitory computer readable storage medium further has instructions encoded thereon that, when executed by the processor, cause the processor to:

receive a comprehensive value from the content-providing user of the online system, the comprehensive value associated with one or more of the plurality of stages of the classification scheme;

receive a content item associated with the stage from the content-providing user of the online system; and determine a pacing value associated with the content item based at least in part on the comprehensive value received from the content-providing user of the online system and on the expected advancement value.

16. The computer program product of claim 15, wherein an association between the content item and the stage is described in a set of targeting criteria associated with the content item.

17. The computer program product of claim 14, wherein the non-transitory computer readable storage medium further has instructions encoded thereon that, when executed by the processor, cause the processor to:

receive additional information describing one or more actions performed by the user of the online system, the one or more actions associated with the content-providing user of the online system;

compare the received additional information describing the one or more actions performed by the user of the online system to the additional set of actions associated with each of the one or more succeeding stages that follow the stage according to the sequential order of the plurality of stages; and responsive to determining that the received additional information describing the one or more actions performed by the user of the online system satisfy at least a threshold number of the additional set of actions associated with a succeeding stage of the one or more succeeding stages, reassign the user of the online system to the succeeding stage.

18. The computer program product of claim 17, wherein receive the additional information describing the one or more actions performed by the user of the online system comprises:

receive a content item associated with the stage from the content-providing user of the online system;

present the content item to the user of the online system; and receive the additional information describing the one or more actions performed by the user of the online system, wherein the one or more actions are associated with the content item.

19. The computer program product of claim 14, wherein the non-transitory computer readable storage medium further has instructions encoded thereon that, when executed by the processor, cause the processor to:

predict the potential cost associated with the reassignment; and predict the likelihood of the reassignment.

20. The computer program product of claim 19, wherein one or more of the potential cost associated with the reassignment and the likelihood of the reassignment are predicted by a machine-learning model.

21. The computer program product of claim 20, wherein the non-transitory computer readable storage medium further has instructions encoded thereon that, when executed by the processor, cause the processor to:

train the machine-learning model based at least in part on a set of historical actions performed by the set of online system users assigned to the stage.

22. The computer program product of claim 14, wherein assign the user of the online system to the stage of the plurality of stages based at least in part on the comparison comprises:

assign the user of the online system to the stage of the plurality of stages responsive to determining that the information describing the set of actions performed by the individual satisfies at least a threshold number of the additional set of actions associated with the stage.

23. The computer program product of claim 14, wherein the sequential order of the plurality of stages is based at least in part on a degree of closeness of a relationship between online system users assigned to each of the plurality of stages and the content-providing user of the online system.

24. The computer program product of claim 23, wherein assign the user of the online system to the stage of the plurality of stages is further based at least in part on the degree of closeness of the relationship between online system users assigned to each of the plurality of stages and the content-providing user of the online system.

25. The computer program product of claim 14, wherein the non-transitory computer readable storage medium further has instructions encoded thereon that, when executed by the processor, cause the processor to:

generate a report indicating the reassignment of the user to the one or more succeeding stages that follow the stage according to the sequential order of the plurality of stages; and communicate the report to the content-providing user of the online system.

26. The computer program product of claim 14, wherein the non-transitory computer readable storage medium further has instructions encoded thereon that, when executed by the processor, cause the processor to:

infer one or more characteristics of the classification scheme based at least in part on the information describing the set of actions performed by the individual, wherein the one or more characteristics of the classification scheme are selected from the group consisting of: a number of the plurality of stages comprising the classification scheme, the additional set of actions associated with each of the plurality of stages comprising the classification scheme, and the sequential order of the plurality of stages.

27. A system comprising:

a processor; and a non-transitory computer-readable medium comprising computer program instructions that when executed by the processor of an online system causes the processor to perform steps comprising:

maintaining, in an online system, a classification scheme associated with a content-providing user of the online system, the classification scheme comprising a plurality of stages having a sequential order, wherein each of the plurality of stages is associated with a different content item received from the content-providing user;

receiving information describing a set of actions performed by an individual, the information describing the set of actions comprising user-identifying information for the individual;

determining whether the received user-identifying information for the individual matches at least some user-identifying information maintained in the online system for a user of the online system;

responsive to determining at least some of the received user-identifying information for the individual matches at least some of the maintained user-identifying information for the user of the online system, comparing the information describing the set of actions performed by the individual to an additional set of actions associated with each of the plurality of stages comprising the classification scheme;

assigning the user of the online system to a stage of the plurality of stages comprising the classification scheme based at least in part on the comparison;

determining an expected return value associated with the stage, the expected return value indicating a potential value to be gained from a set of online system users assigned to the stage;

determining an expected advancement value indicating a value associated with a reassignment of the user to one or more succeeding stages that follow the stage according to the sequential order of the plurality of stages, the expected advancement value based at least in part on one or more of: the expected return value associated with the stage, a potential cost associated with the reassignment, and a likelihood of the reassignment;

adjusting pacing values for one or more content items associated with the stage and the one or more succeeding stages based on corresponding expected advancement values, wherein the pacing values represent rates at which the one or more content items are selected for presentation;

selecting a content item from the one or more content items for presentation to the user based in part on the adjusted pacing values; and presenting the selected content item to the user in a newsfeed of the online system.

\* \* \* \* \*